(12) United States Patent  
Won et al.

(10) Patent No.: US 9,519,397 B2
(45) Date of Patent: Dec. 13, 2016

(54) DATA DISPLAY METHOD AND APPARATUS

(71) Applicant: Samsung Electronics Co., Ltd., Gyeonggi-do (KR)

(72) Inventors: Sungjoon Won, Gyeonggi-do (KR); Jieun Yang, Busan (KR); Masato Watanabe, Seoul (KR); Yun Jegal, Seoul (KR); Jongsung Joo, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 202 days.

(21) Appl. No.: 14/014,755

(22) Filed: Aug. 30, 2013

(65) Prior Publication Data

US 2014/0068478 A1   Mar. 6, 2014

(30) Foreign Application Priority Data

Aug. 31, 2012 (KR) ........................ 10-2012-0096101

(51) Int. Cl.
*G06F 3/048* (2013.01)
*G06F 3/0481* (2013.01)
*G06F 3/0488* (2013.01)
*G06F 3/0485* (2013.01)

(52) U.S. Cl.
CPC ......... *G06F 3/04817* (2013.01); *G06F 3/0485* (2013.01); *G06F 3/0488* (2013.01)

(58) Field of Classification Search
USPC ....................................................... 715/765
See application file for complete search history.

(56) References Cited

U.S. PATENT DOCUMENTS

| 2008/0057926 | A1* | 3/2008 | Forstall ................. G06F 3/0482 455/415 |
| 2008/0270931 | A1 | 10/2008 | Bamford |
| 2009/0144661 | A1 | 6/2009 | Nakajima et al. |
| 2009/0201261 | A1* | 8/2009 | Day .............................. 345/173 |
| 2009/0271702 | A1 | 10/2009 | Bamford et al. |
| 2010/0134425 | A1* | 6/2010 | Storrusten ............ G06F 3/0425 345/173 |
| 2010/0306648 | A1* | 12/2010 | Wilairat ....................... 715/702 |
| 2010/0321411 | A1 | 12/2010 | Paek et al. |
| 2011/0283188 | A1 | 11/2011 | Farrenkopf et al. |
| 2012/0052921 | A1* | 3/2012 | Lim et al. ..................... 455/566 |
| 2012/0064946 | A1* | 3/2012 | Voetberg et al. ............. 455/566 |
| 2012/0096393 | A1 | 4/2012 | Shim et al. |
| 2014/0013243 | A1* | 1/2014 | Flynn, III ............. G06F 3/0488 715/753 |

FOREIGN PATENT DOCUMENTS

| EP | 1 986 087 A2 | 10/2008 |
| EP | 2 112 588 A1 | 10/2009 |
| KR | 10-2009-0079063 A | 7/2009 |

\* cited by examiner

*Primary Examiner* — Thanh Vu
(74) *Attorney, Agent, or Firm* — Cha & Reither, LLC

(57) ABSTRACT

A data display method and apparatus display data efficiently on the screen of an electronic device equipped with a touchscreen. The data display method includes setting a scroll rate to a touch movement distance; detecting a touch gesture in a first region of the touchscreen; scrolling icons in the first region at the scroll rate in response to the touch gesture; and displaying detailed information associated with at least one icon newly displayed according to the scroll in a second region of the touchscreen.

15 Claims, 23 Drawing Sheets

DATA DISPLAY METHOD AND APPARATUS

CLAIM OF PRIORITY

This application claims, pursuant to 35 U.S.C. §119(a), priority from and the benefit of the earlier filing date of a Korean patent application filed on Aug. 31, 2012 in the Korean Intellectual Property Office and assigned Serial No. 10-2012-0096101, the entire disclosure of which is hereby incorporated by reference.

BACKGROUND

1. Field of the Invention

The present disclosure relates to a data display method and apparatus of an electronic device equipped with a touchscreen.

2. Description of the Related Art

Mobile terminals in the prior art are used as tools for a wireless voice communication and information exchange. Unlike the early stage of the development of mobile terminals when such early mobile terminals had only been recognized as a portable and radio communication-capable device, the mobile terminal has become a multifunctional device with the advance of technologies. For example, the mobile terminal provides various features including a phonebook, a game, a short message service, an email service, a morning call service, a music player, a schedule organizer, a digital camera, a device for wireless Internet access, etc.

Mobile terminals in the prior art, e.g. smartphones, are capable of multitasking with the advance in computing unlike other types of mobile terminals in the prior art, for example, the so-called feature phones. For example, the multitasking-capable mobile terminal allows the user to be aware of an inbound text message while listening to music or watching a movie. As more and more functions are integrated into a mobile terminal, there is a need for a sophisticated interface technology facilitating access to the application responsible for a user-intended task. The touchscreen is one possible device to accomplish such an interface for the mobile terminal.

Meanwhile, scrolling is an action that is performed to navigate through data in vertical and horizontal directions on a display in response to a touch gesture on or near the touchscreen. As the scroll action is performed, a part of the data disappears while another part appears on the screen. The scroll function is useful for viewing data too large to display on the screen at one time. However, since the scroll range is fixed, the user may have to repeat the scroll gesture several times to reach the wanted part of the data.

SUMMARY

The present invention includes a data display method and apparatus that are capable of facilitating navigation of data through an improved scroll action on the touchscreen. Also, the present invention includes a data display method and apparatus that is capable of configuring a scroll offset, i.e. a scroll rate to touch movement distance, thereby scrolling the data at a user-intended speed. Furthermore, the present invention includes a method and apparatus that are capable of dividing the screen into a first region and a second region to reflect the scroll gesture detected in one region to the scroll action in the other region.

In accordance with an aspect of the present invention, a data display method of an electronic device having a touchscreen includes setting a scroll rate to a touch movement distance; detecting a touch gesture in a first region of the touchscreen; scrolling icons in the first region at the scroll rate in response to the touch gesture; and displaying detailed information associated with one of at least one icon newly appeared according to the scroll in a second region of the touchscreen.

In accordance with another aspect of the present invention, a data display method of the electronic device having a touchscreen includes displaying icons in a first region of the touchscreen and detailed information of one of the icons in a second region of the touchscreen; changing a display level of the icons in the first region; and displaying detailed information of one of the icons with changed display level in the second region.

In accordance with another aspect of the present invention, the electronic device includes a display unit which has a touchscreen including a first region for displaying icons and a second region for displaying detailed information of one of the icons; and a control unit which controls setting a scroll rate to a touch movement distance, detecting a touch gesture in a first region of the touchscreen, scrolling icons in the first region at the scroll rate in response to the touch gesture, and displaying detailed information associated with one of at least one icon newly appeared according to the scroll in a second region of the touchscreen.

In accordance with still another aspect of the present invention, the electronic device includes a display unit which a touchscreen having a first region for displaying icons and a second region for displaying detailed information of one of the icons; and a control unit which controls the display unit to change a display level of the icons in the first region and display the detailed information of one of the icons with changed display level in the second region.

BRIEF DESCRIPTION OF THE DRAWINGS

The above and other features and advantages of the present invention will become more apparent by describing in detail exemplary embodiments thereof with reference to the attached drawings in which.

Figure 3:
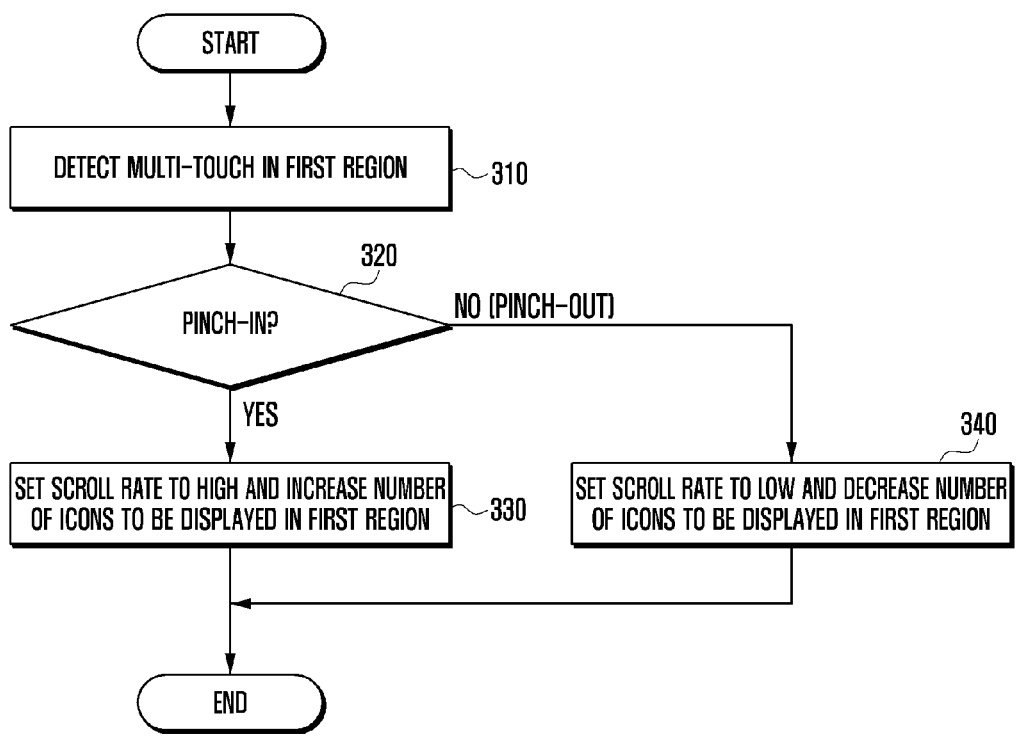
FIG. 3 is a flowchart illustrating the scroll rate setting method of the data display method according to the exemplary embodiment of the present invention.

(Comment—In step 330 in FIG. 3, the word "RAT" should be corrected to "RATE". Please provide us with a new FIG. 3 with this correction, as per our attached modified drawings.)

Figure 4:
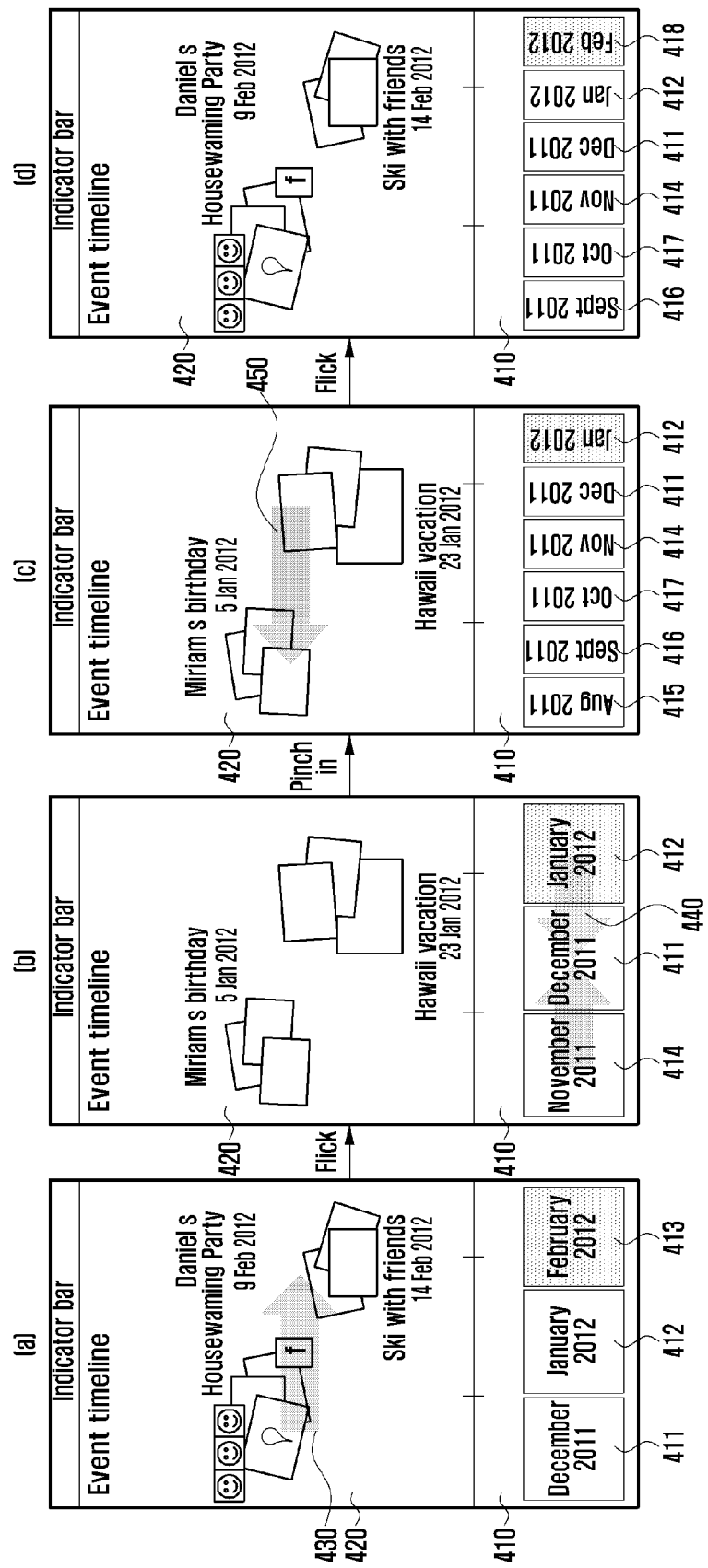
Figure 5:
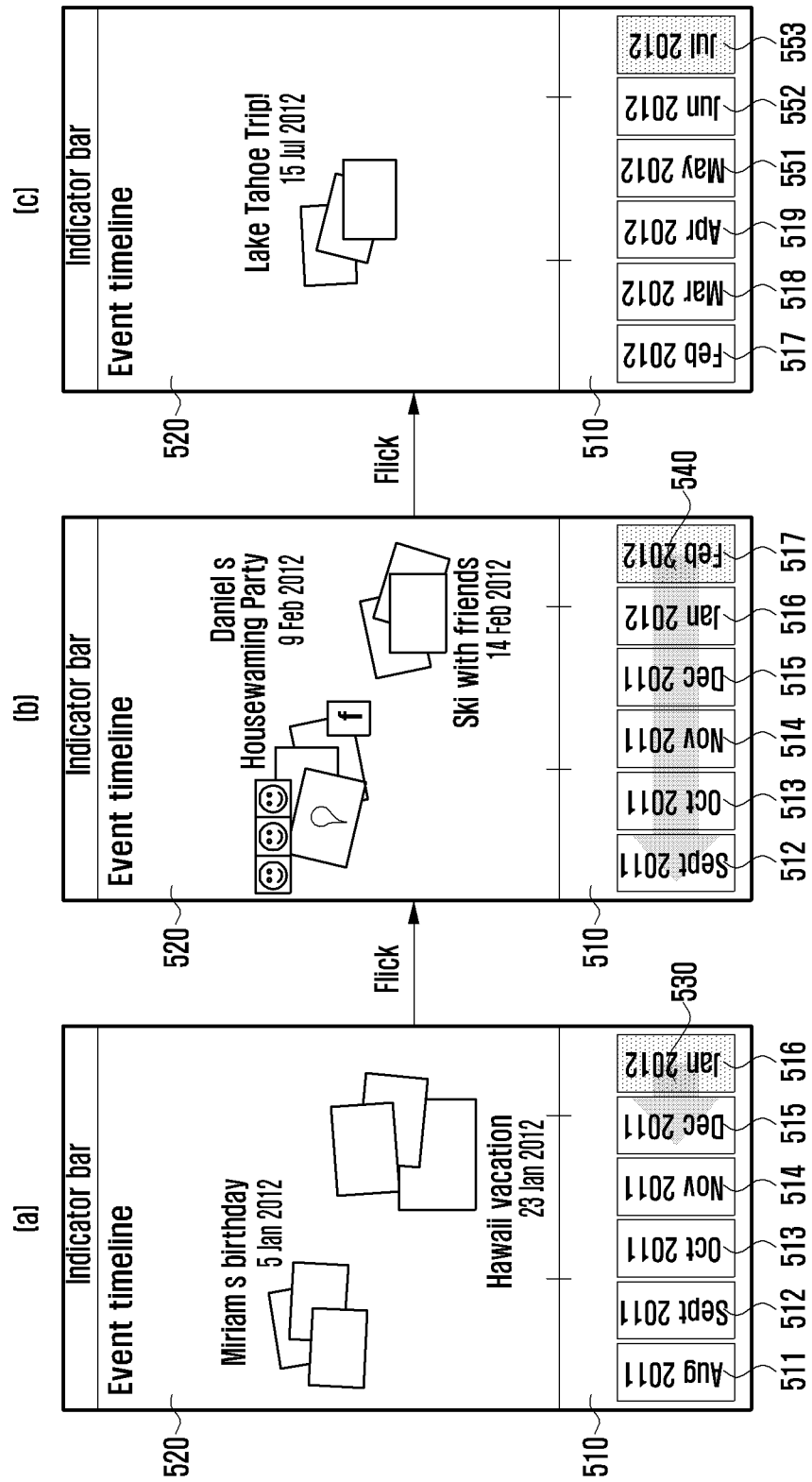

FIGS. 4 and 5 are diagrams illustrating exemplary screen images of the data display method according to the exemplary embodiment of the present invention;

(Comment—In screen (a) of FIG. 4, the reference number "430" and a line from "430" to the gray arrow should be added. Please provide us with a new FIG. 4 with these corrections, as per our attached modified drawings.)

Figure 6A:
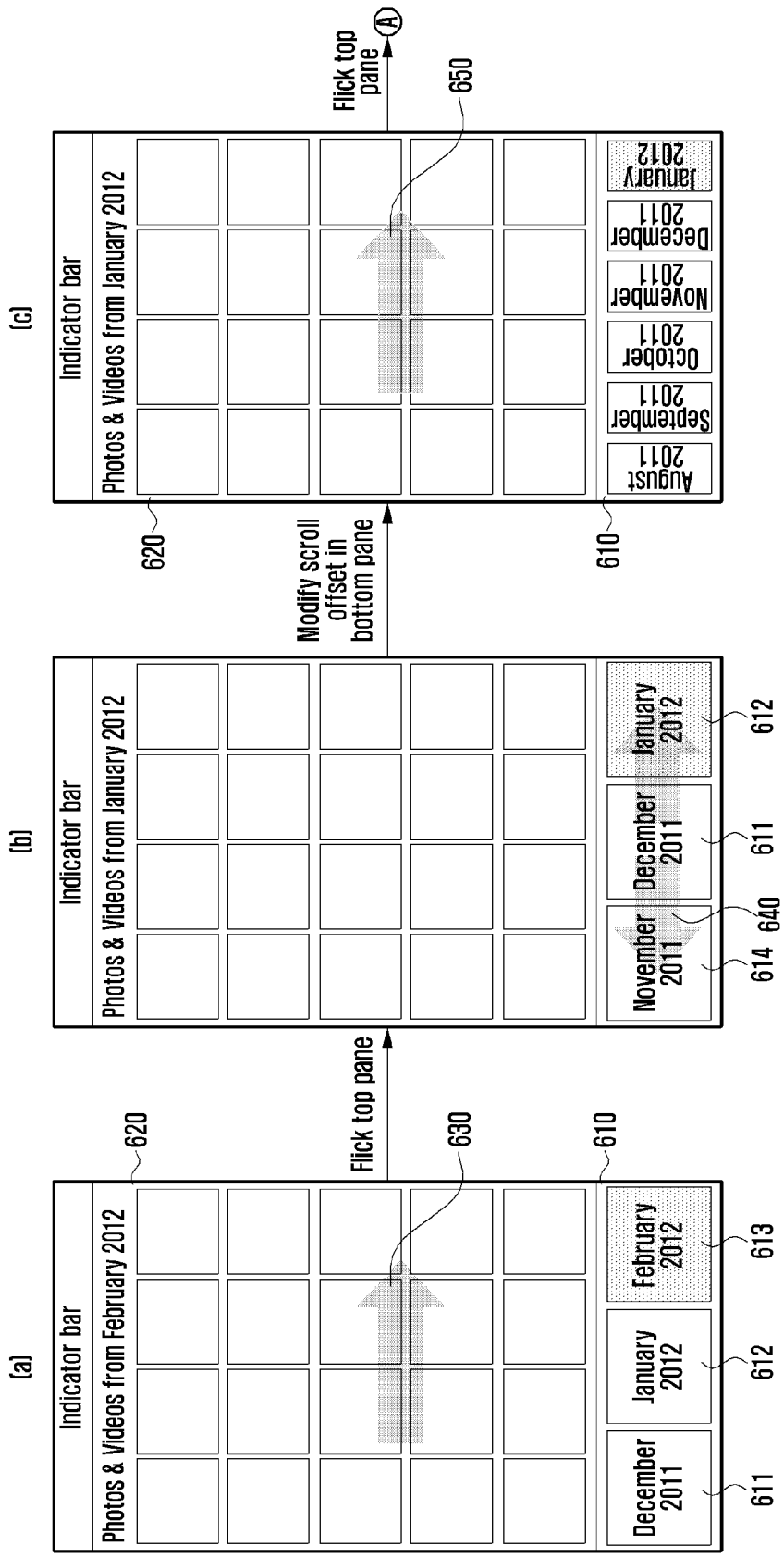
Figure 6B:
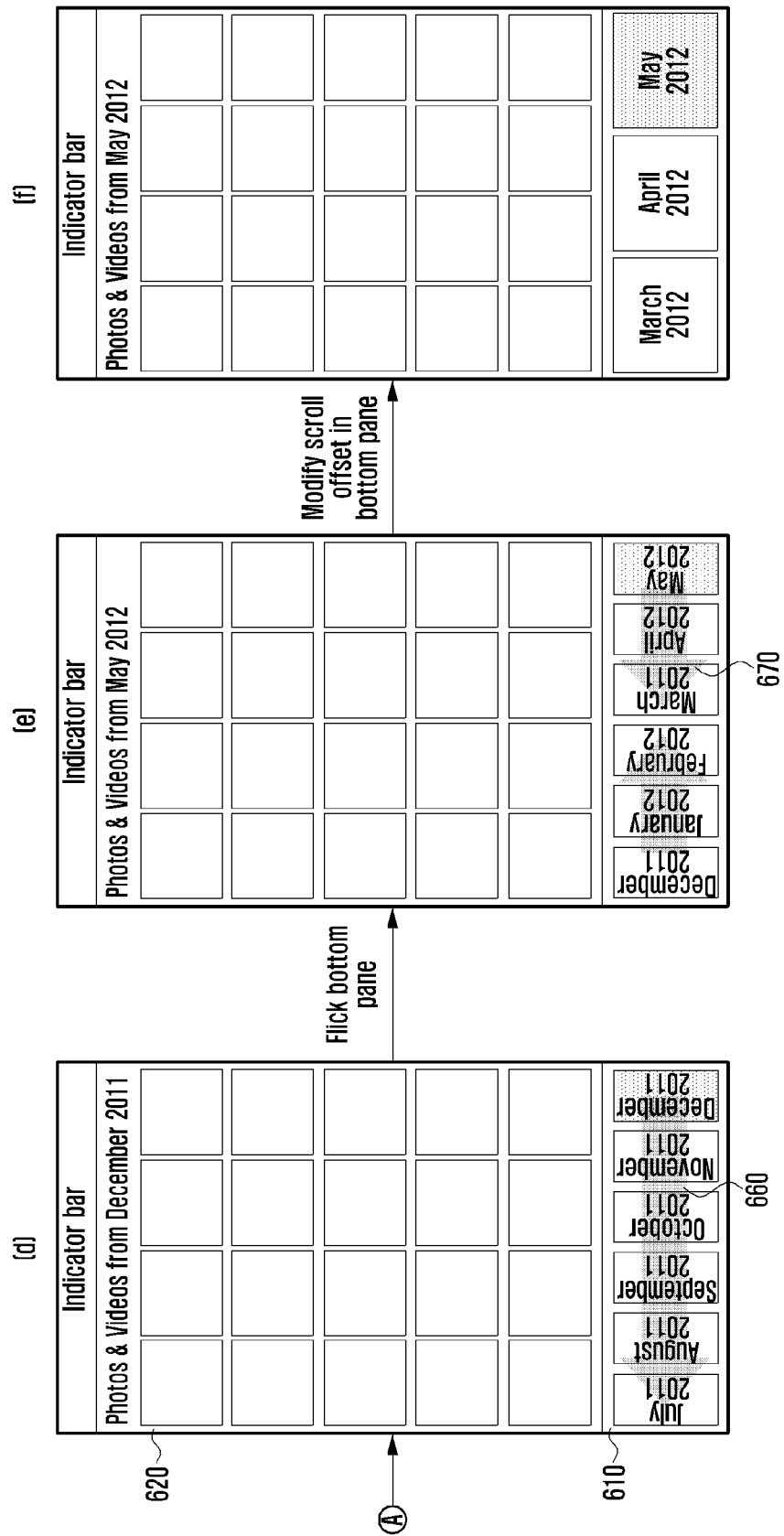
Figure 7A:
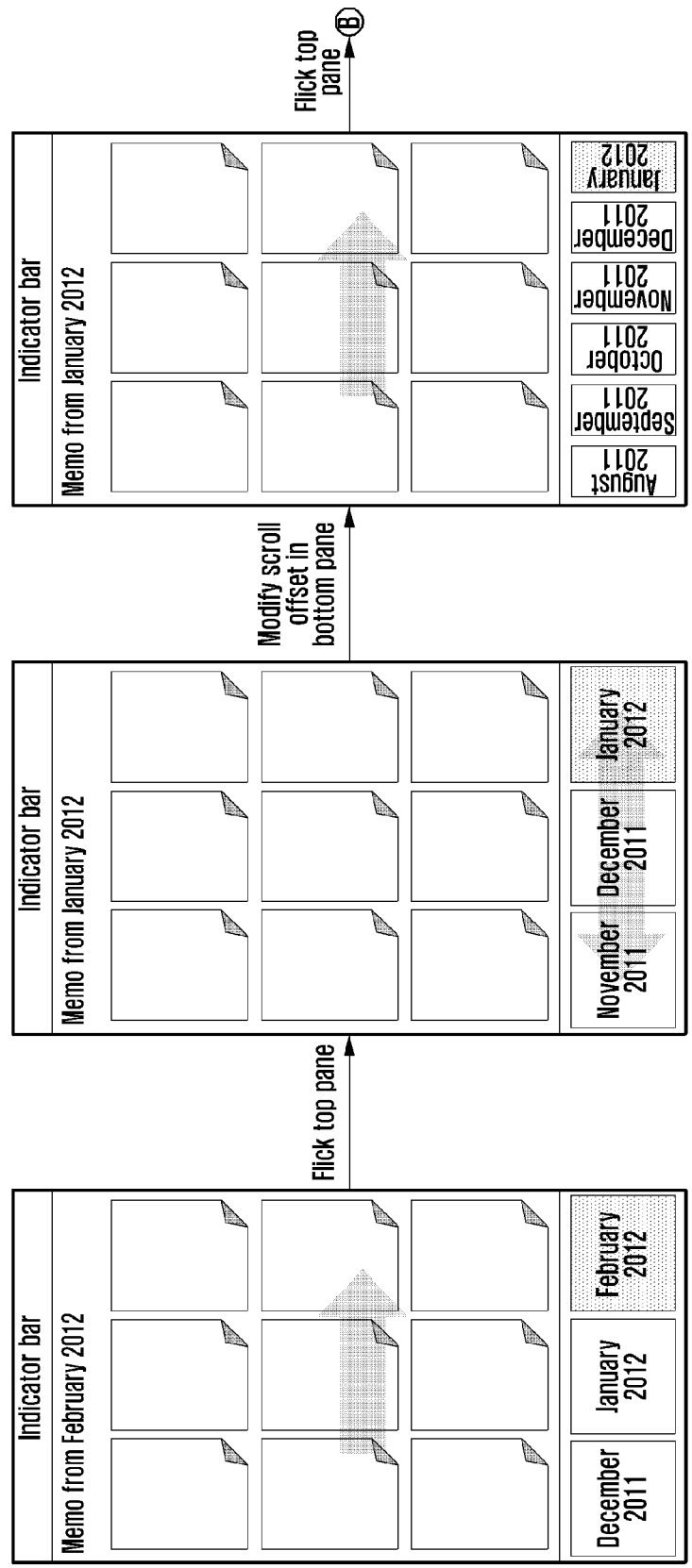
Figure 7B:
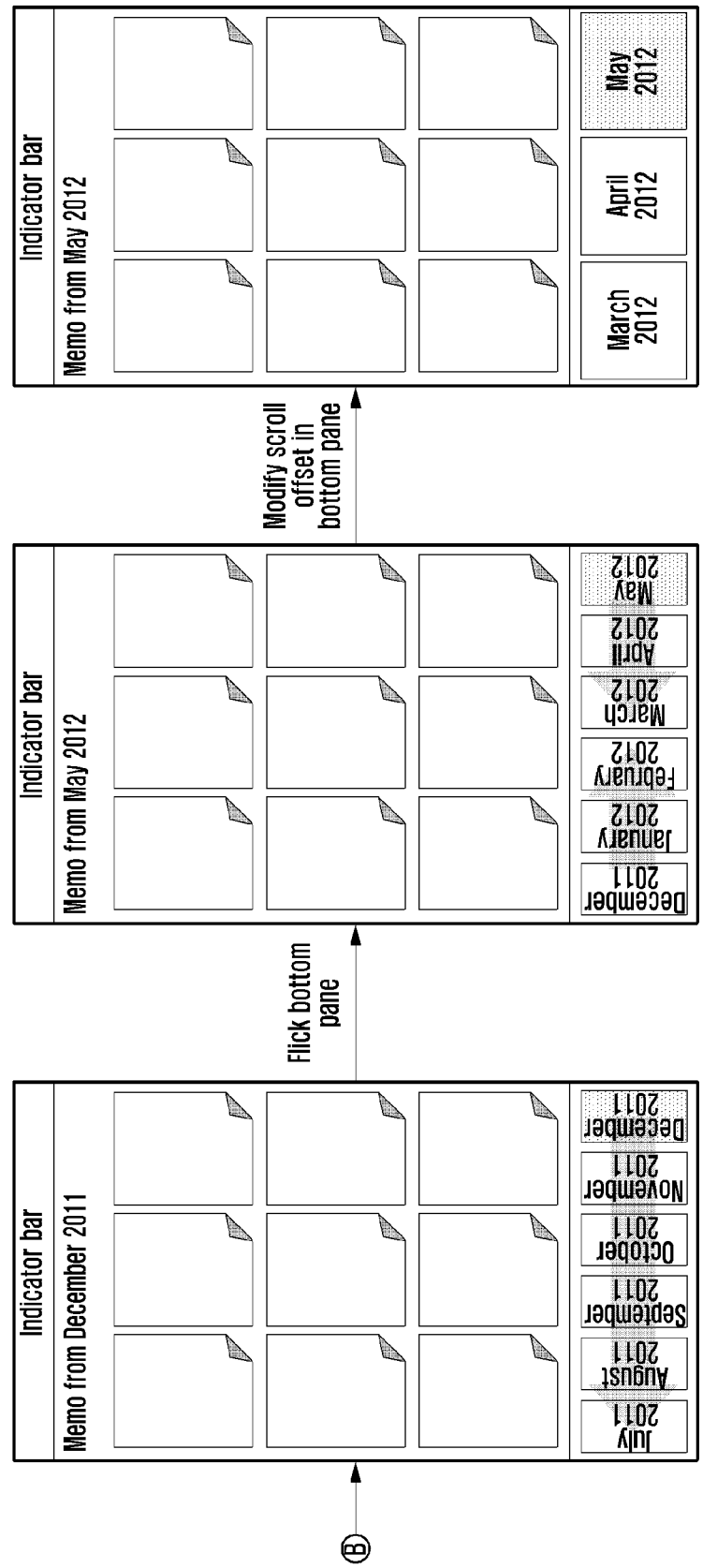
Figure 8A:
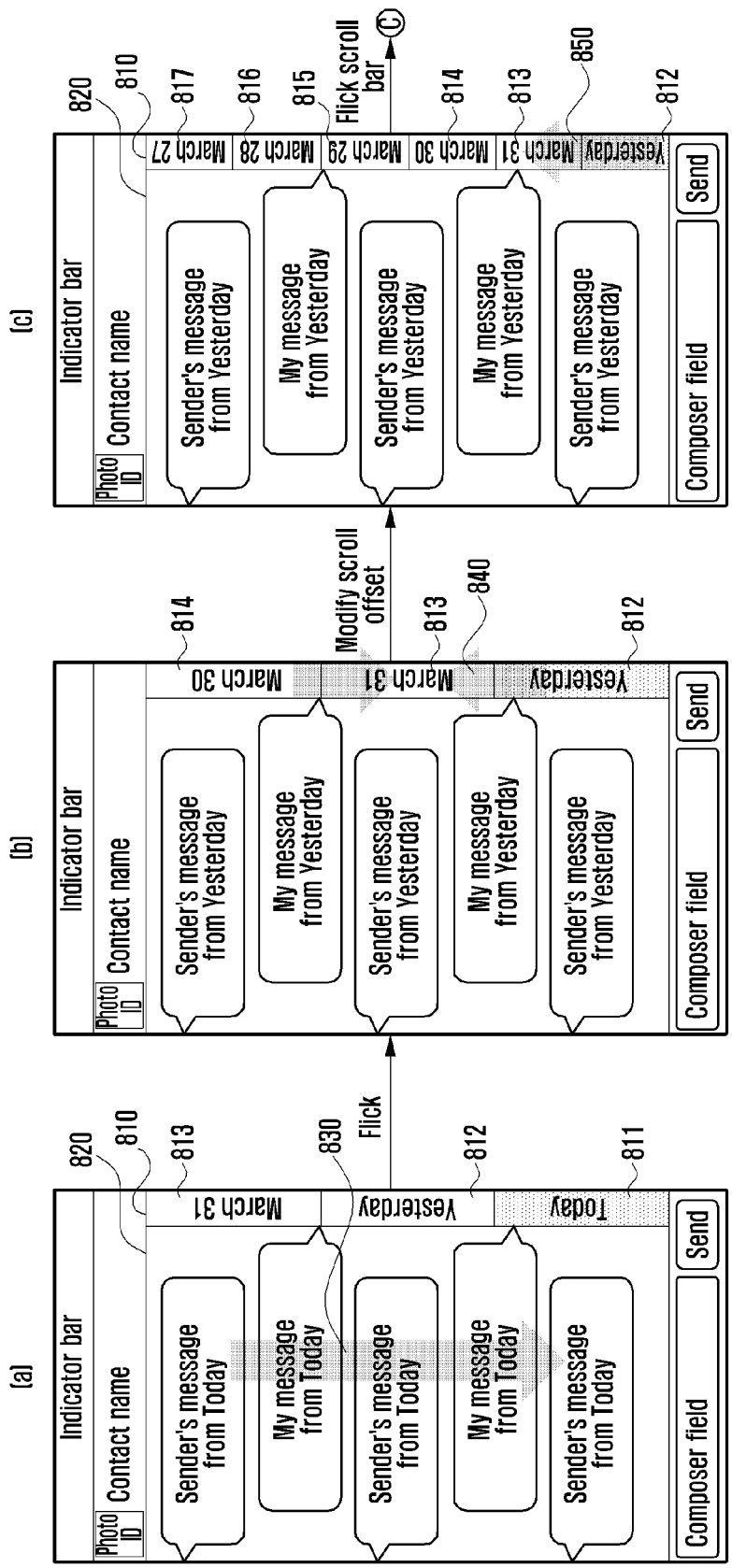
Figure 8B:
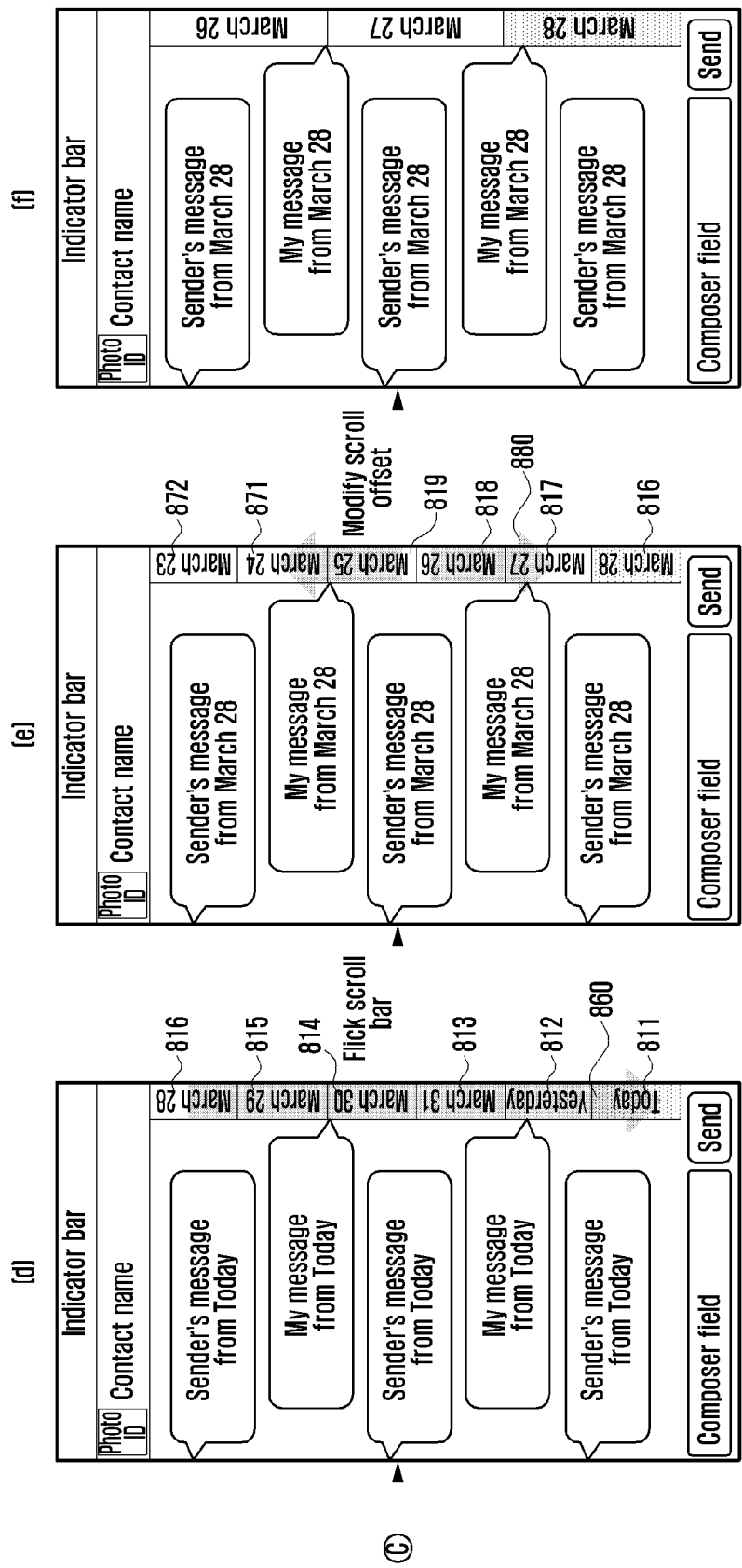
Figure 9:
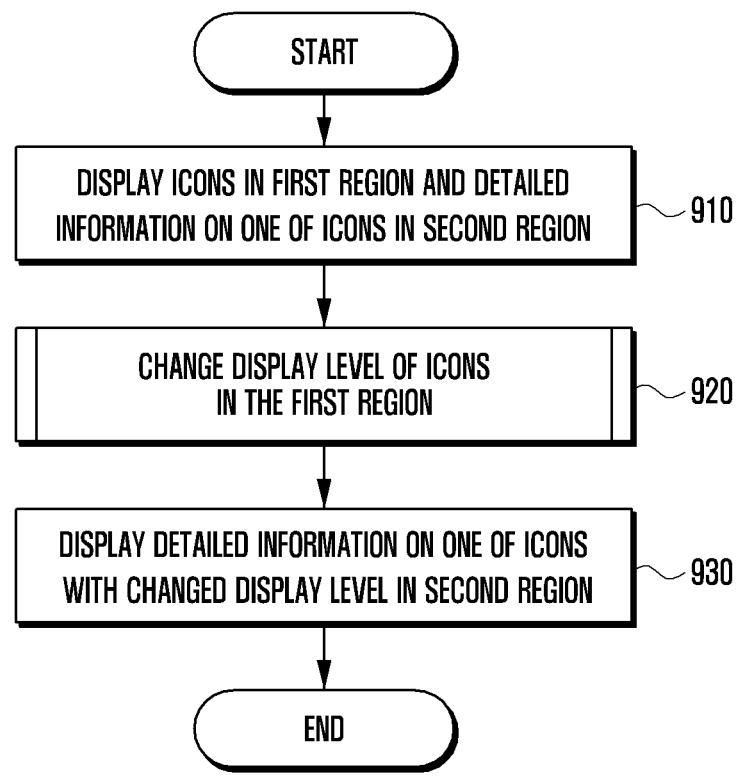
Figure 10:
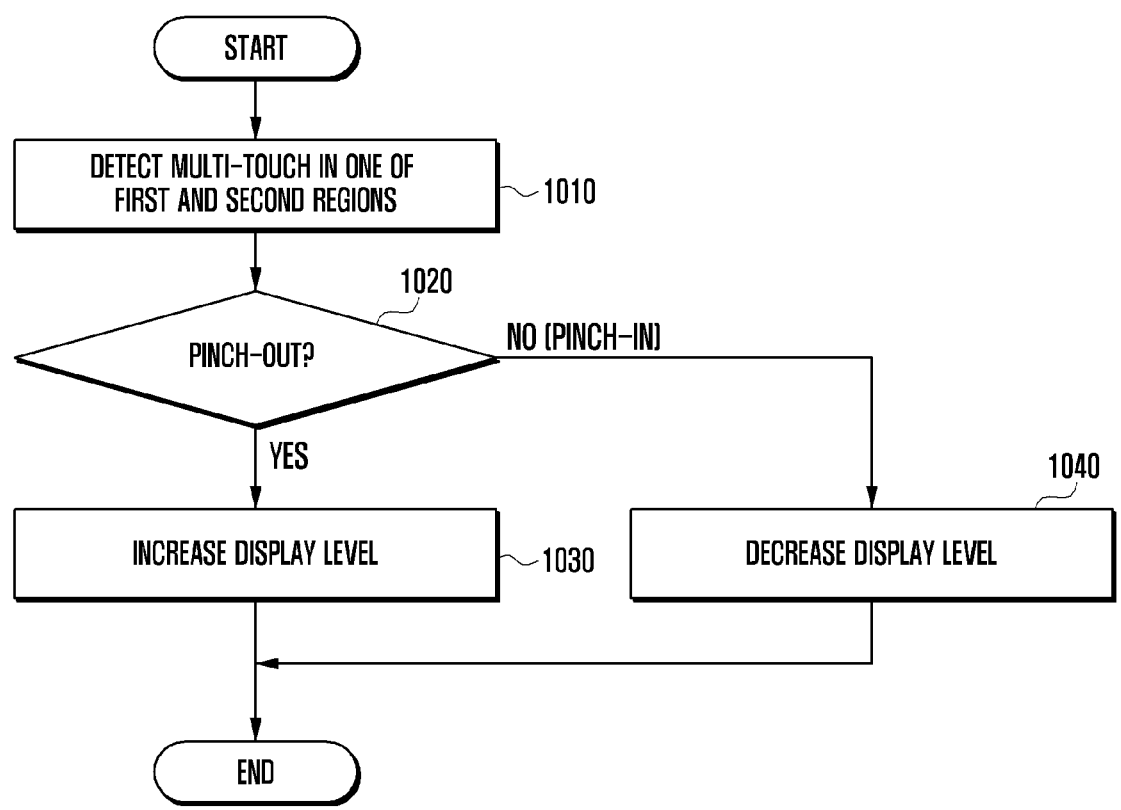
Figure 11A:
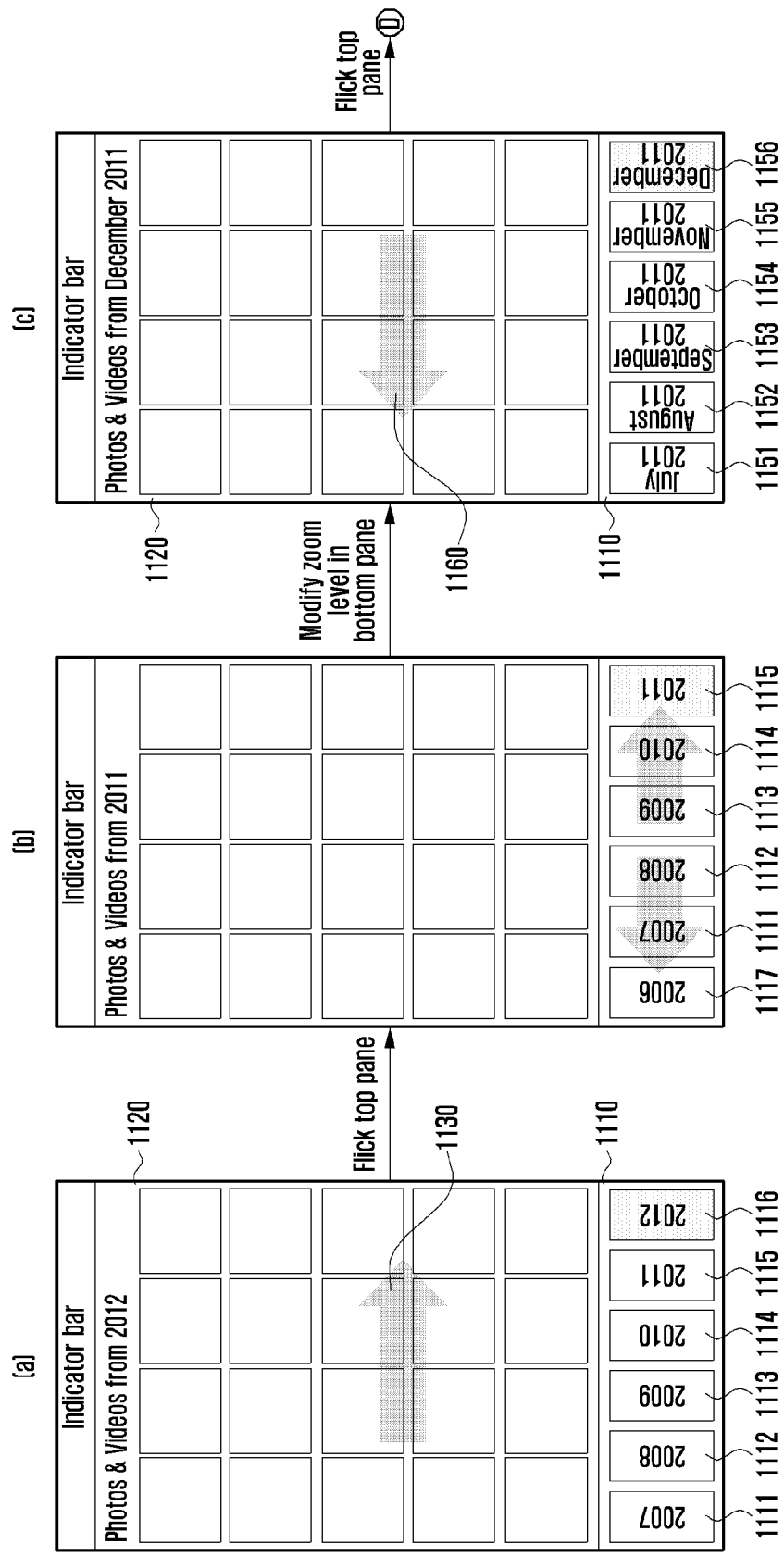
Figure 11B:
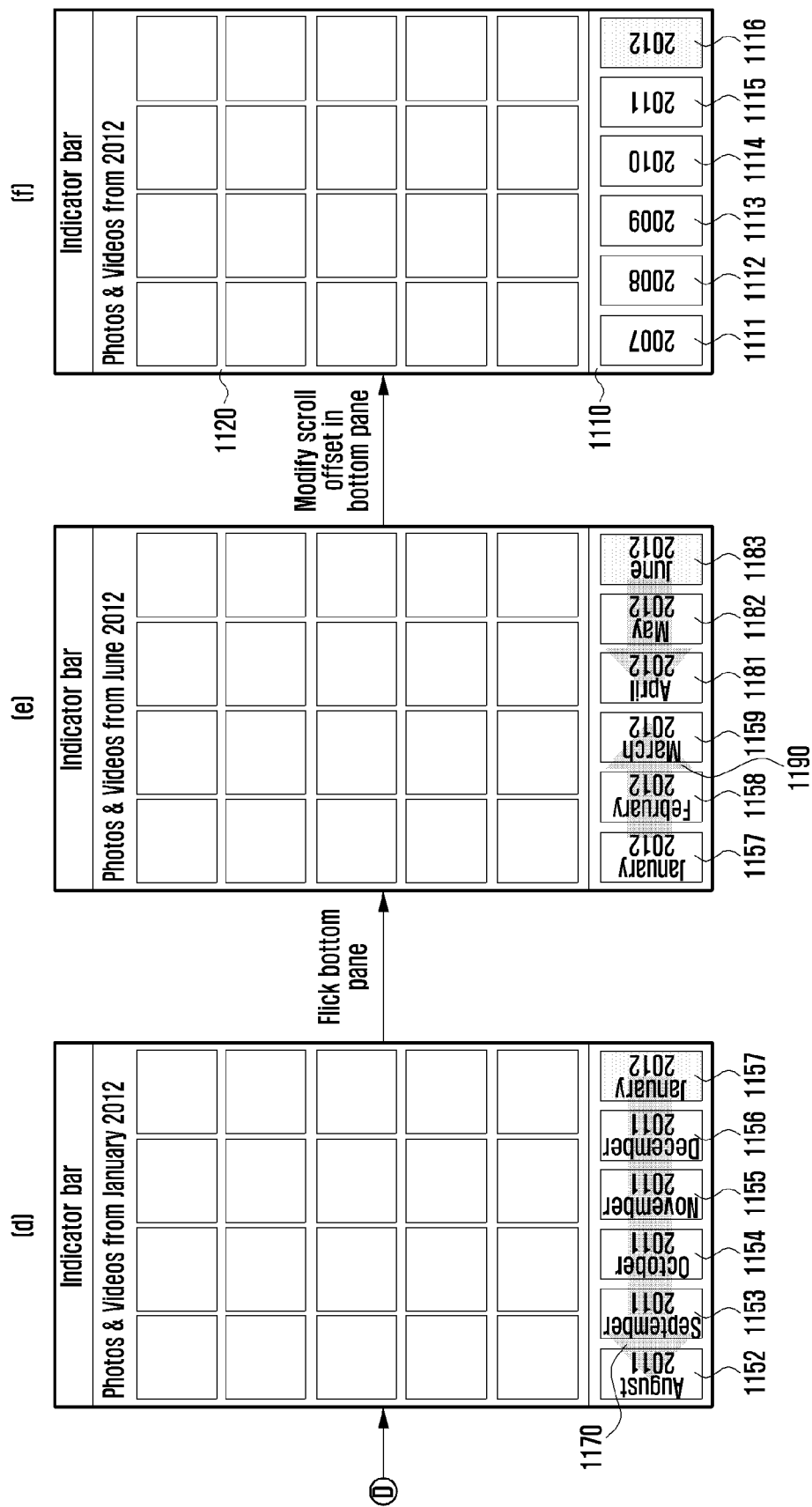
Figure 12A:
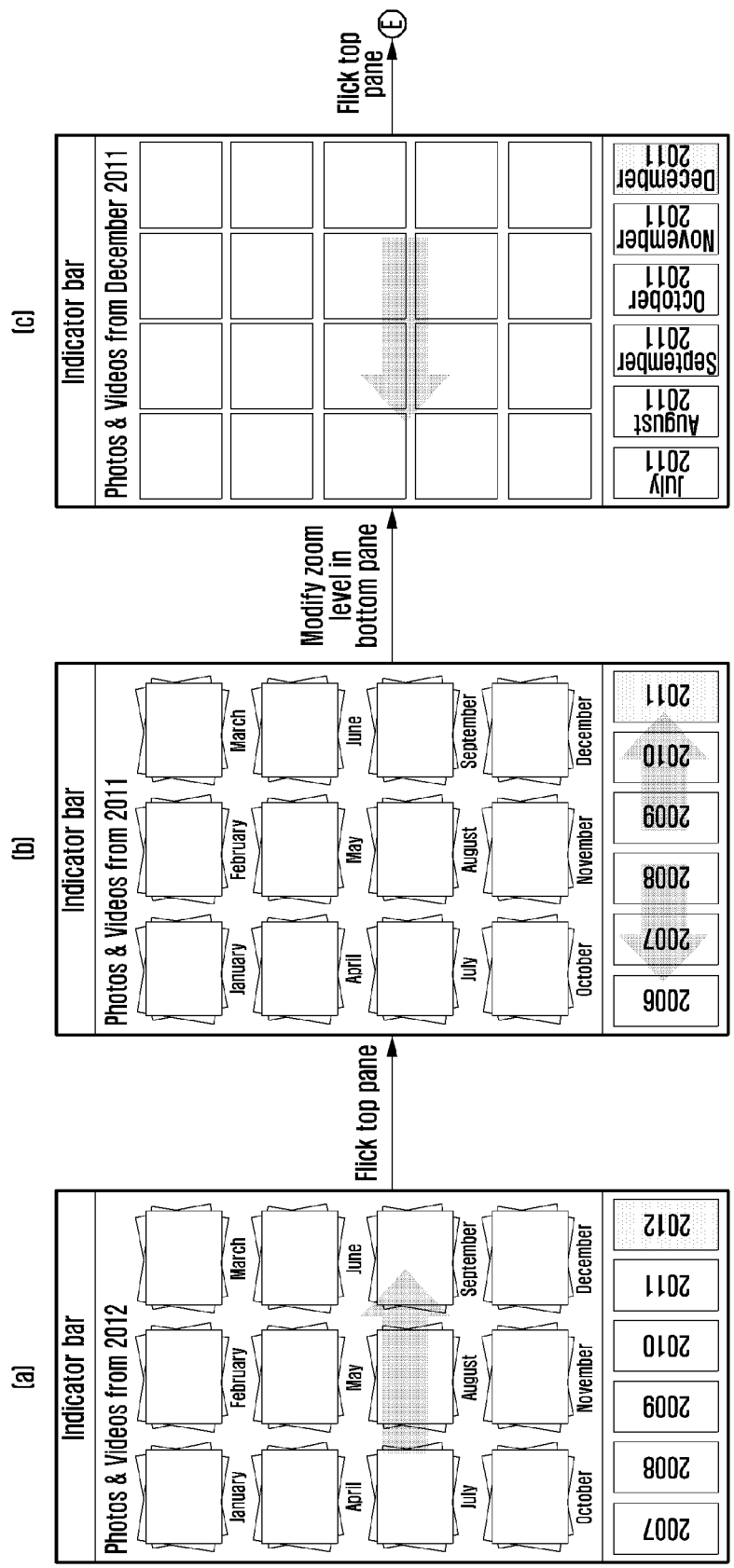
Figure 12B:
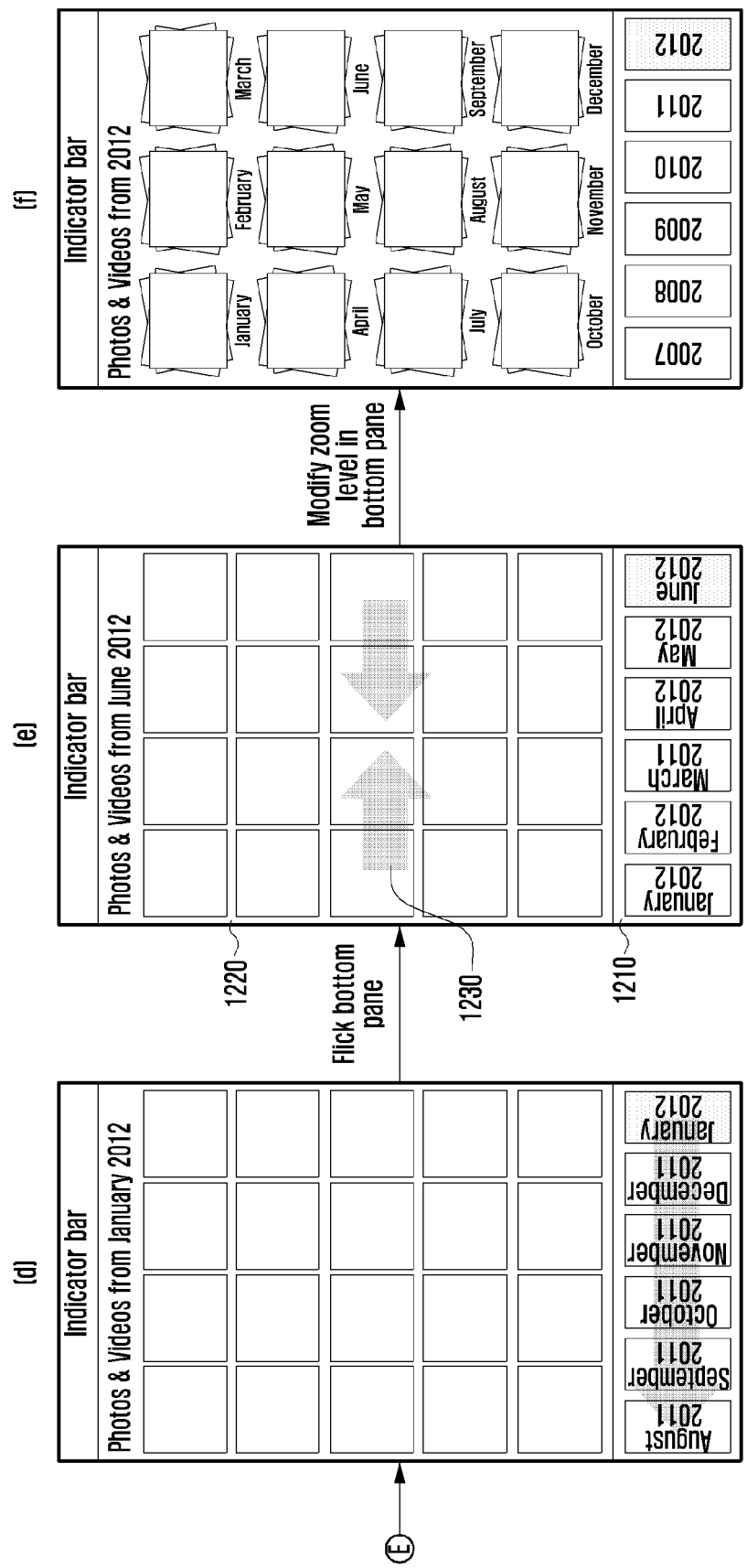
Figure 13A:
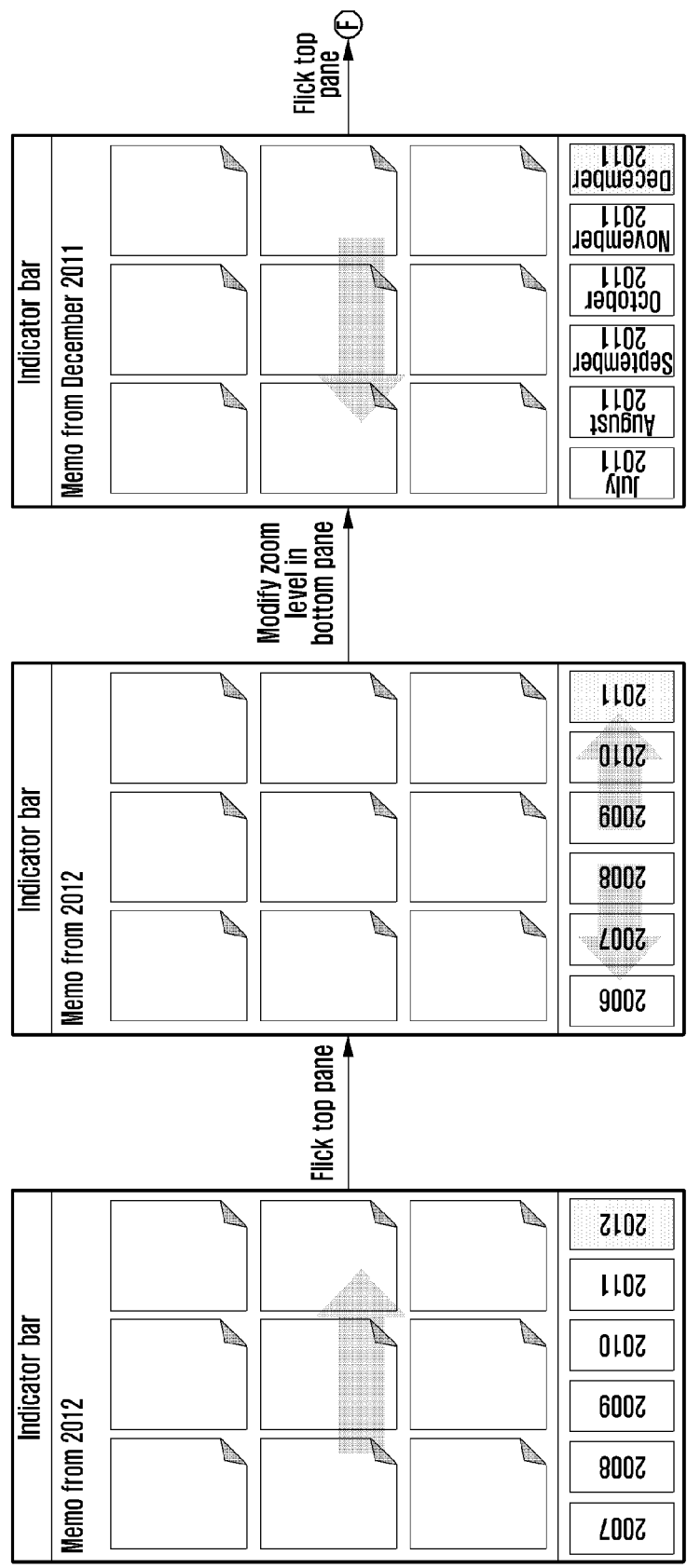
Figure 13B:
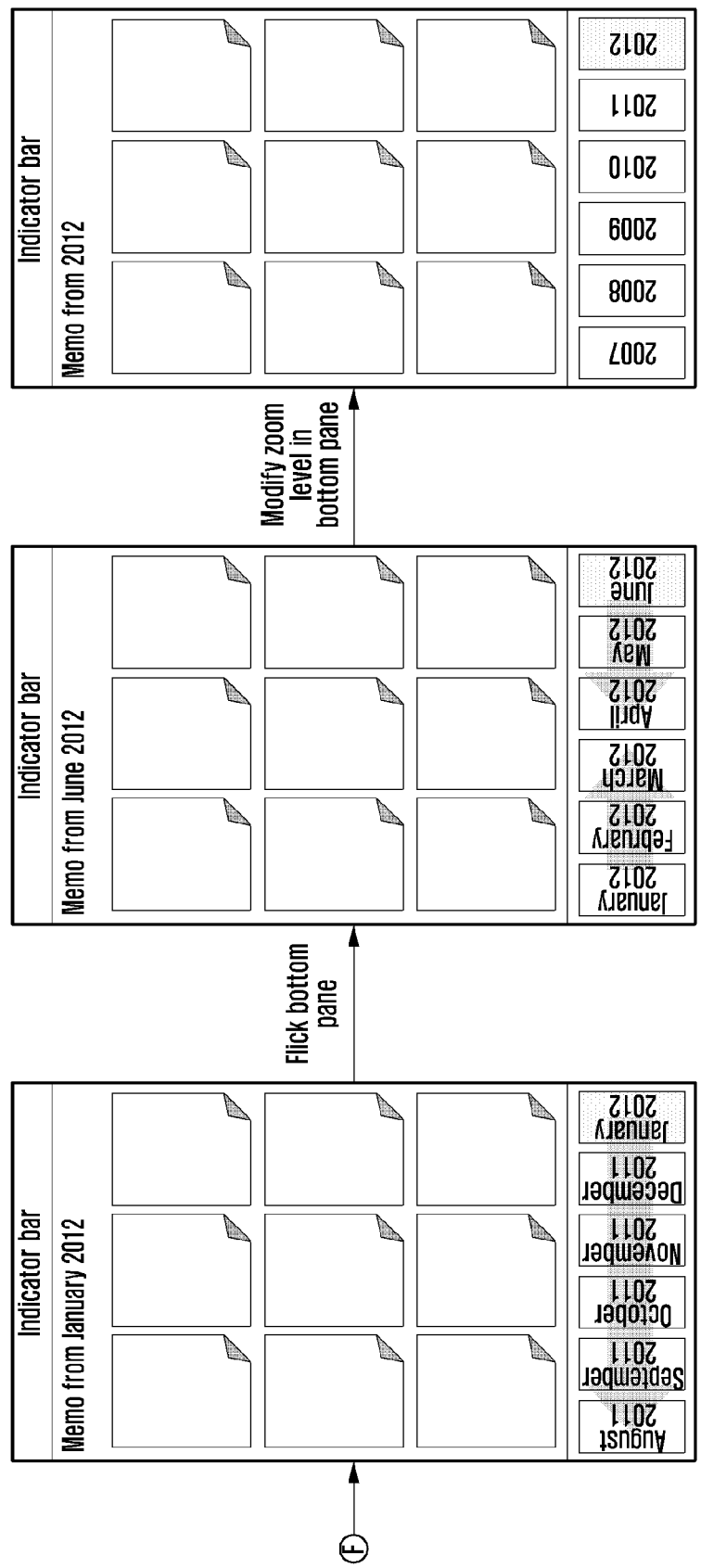
Figure 14A:
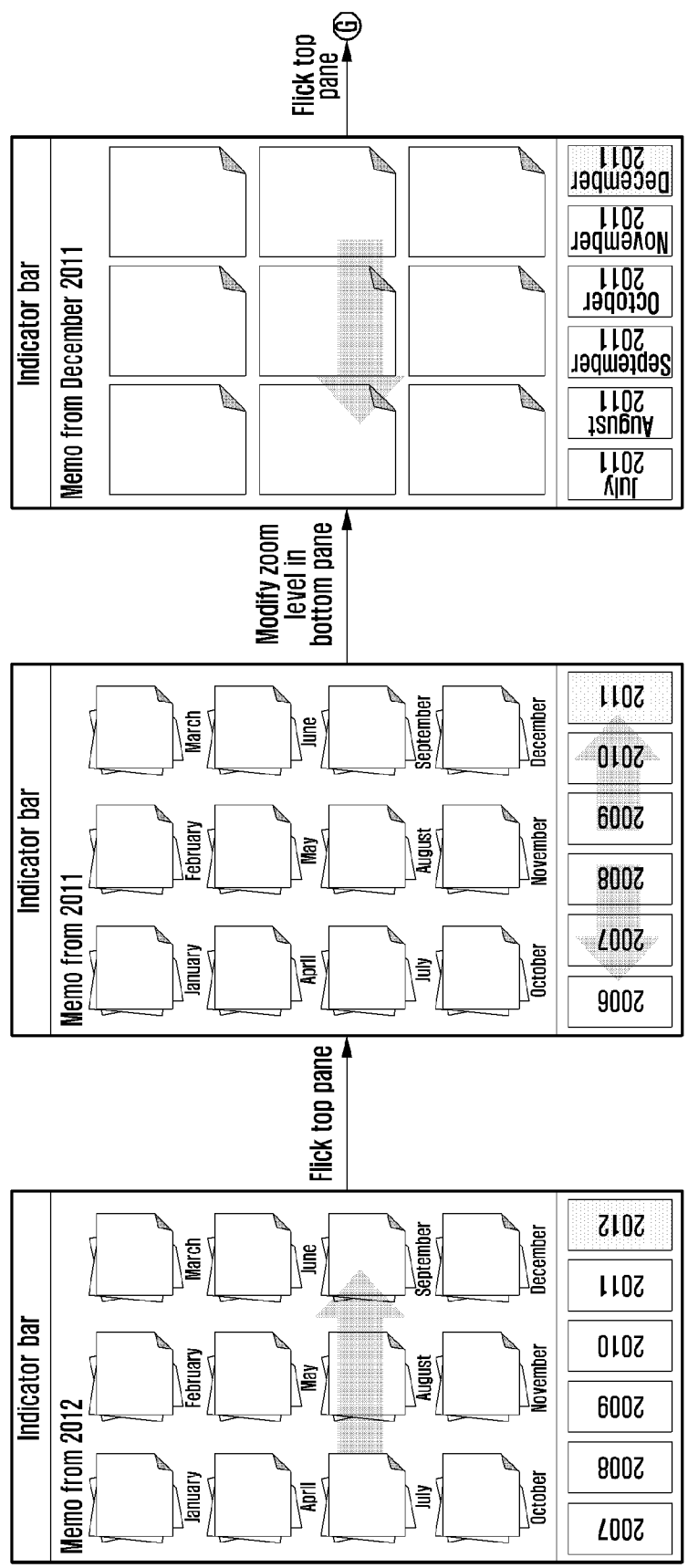
Figure 14B:
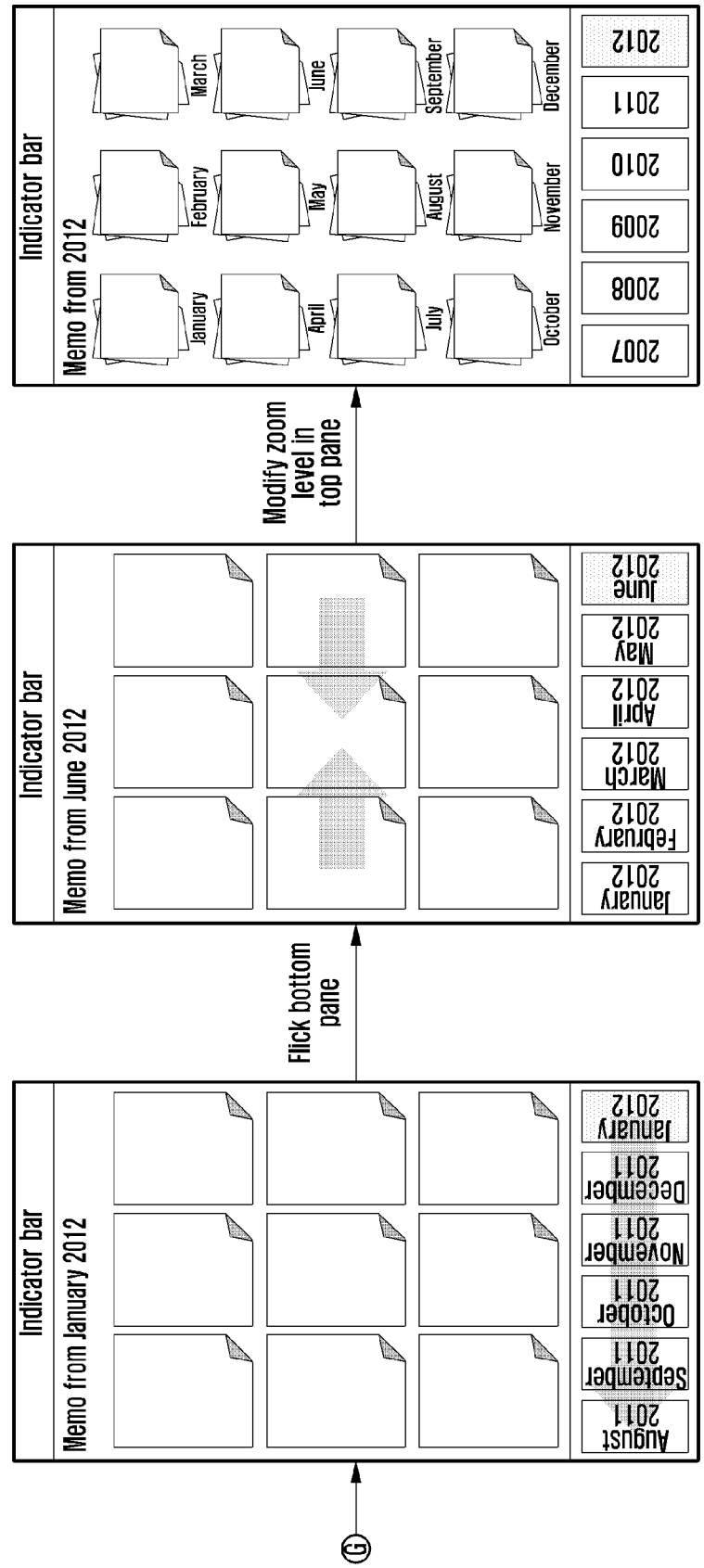
Figure 15A:
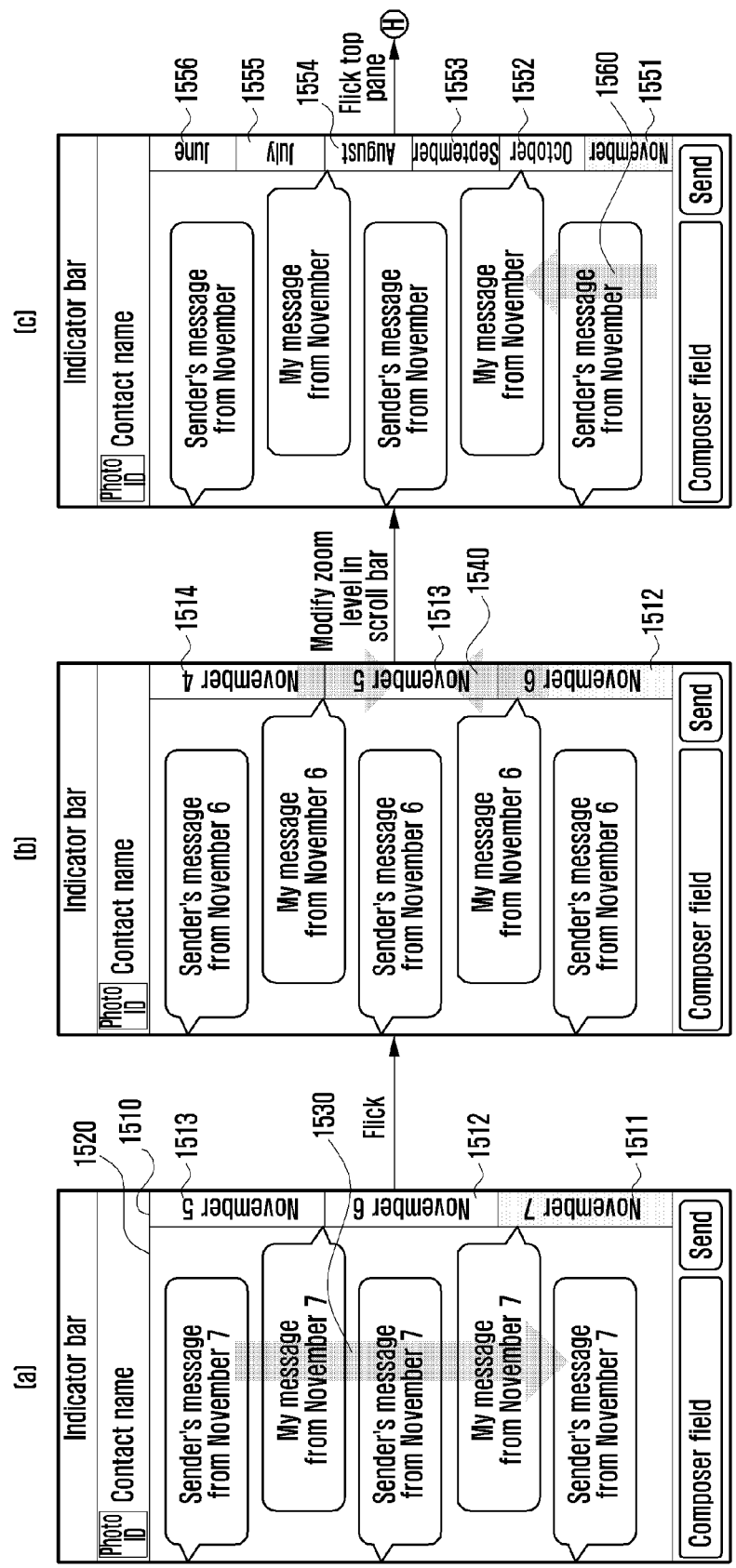
Figure 15B:
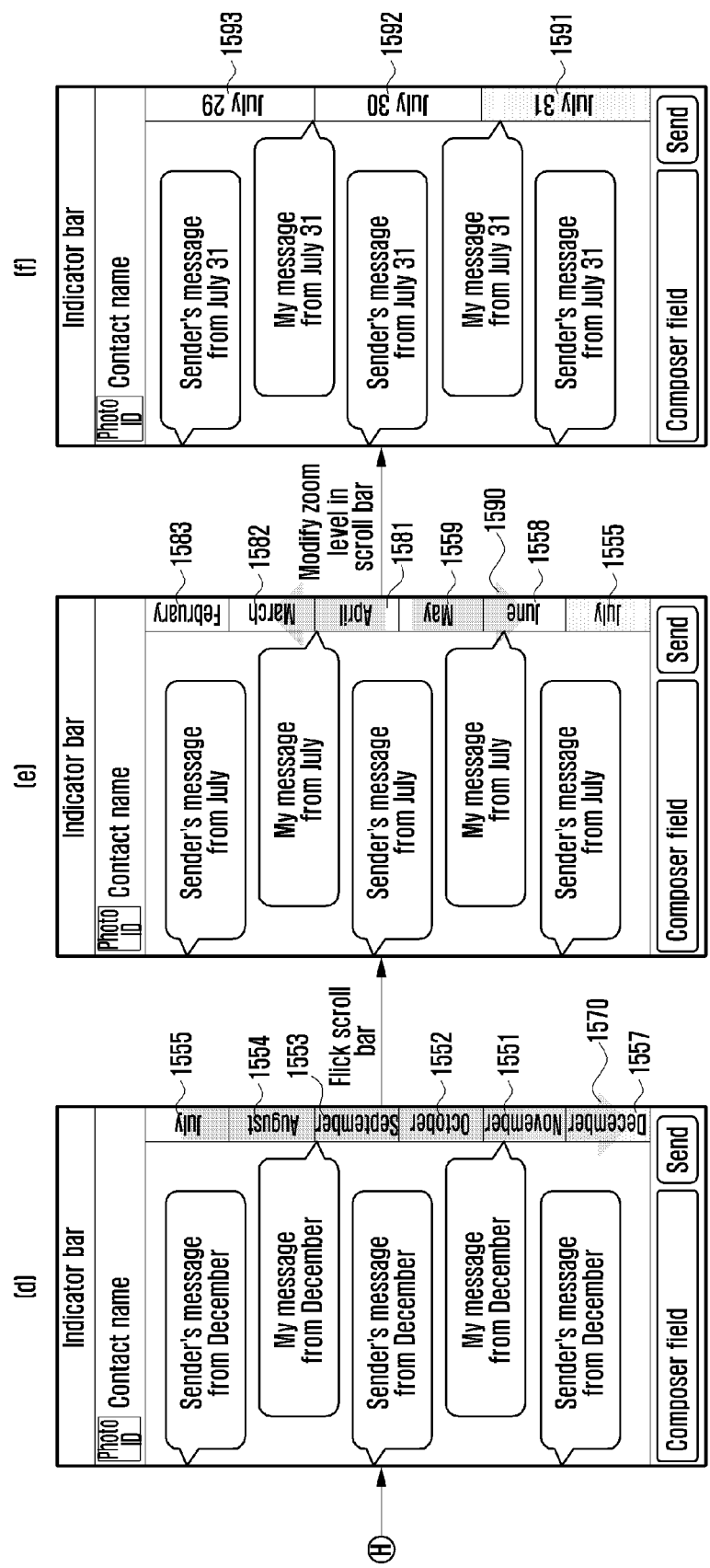

FIGS. 6A and 6B are diagrams illustrating exemplary screen images of the data display method associated with a gallery application according to an alternative exemplary embodiment of the present invention;

FIGS. 7A and 7B are exemplary screen images of the data display method associated with a memo application according to the alternative exemplary embodiment of the present invention;

FIGS. 8A and 8B are diagrams illustrating exemplary screen images of the data display method in association with a messaging application according to the exemplary embodiment of the present invention;

FIG. 9 is a flowchart illustrating the data display method according to the alternative exemplary embodiment of the present invention;

FIG. 10 is a flowchart illustrating the icon display level change method of the data display method according to the exemplary embodiment of the present invention;

FIGS. 11A and 11B are diagrams illustrating exemplary screen images of the data display method in association with a gallery application according to the exemplary embodiment of the present invention;

FIGS. 12A and 12B are diagrams illustrating exemplary screen images of the data display method in association with a gallery application according to the alternative exemplary embodiment of the present invention;

FIGS. 13A, 13B, 14A, and 14B are diagrams illustrating exemplary screen images of the data display method in association with a memo application according to the exemplary embodiment of the present invention; and FIGS. 15A and 15B are diagrams illustrating exemplary screen images of the data display method in association with a messaging application according to the exemplary embodiment of the present invention.

DETAILED DESCRIPTION

The data display method and apparatus according to an exemplary embodiment of the present invention is applicable to various types of touchscreen-enabled electronic devices such as multimedia devices including a smartphone, a tablet PC, a laptop PC, a desktop PC, TV, a navigation device, a video phone, etc. The data display method and apparatus of the present invention is also applicable to other known electronic devices such as multimedia-enabled devices e.g. a communication function-enabled and touchscreen-enabled refrigerator.

The data display method and apparatus according to the exemplary embodiment of the present invention displays icons of the first region of the touchscreen and the detailed information of the icon (which is selected from the first region) in the second region. Here, the icon is associated with a characteristic of media or information, such as a date or a location. The detailed information can be any of a schedule, a memo, an exchanged message, a photo, a video, etc. that are associated with the corresponding date or location. The icon also can be a thumbnail image of one of the chapters of a video. Here, the chapters can be discriminated by time. For example, a chapter may have a running time of about 10 minutes. In this case, the detailed information can be a playback screen of one of the chapters.

The data display method and apparatus according to the exemplary embodiment of the present invention are capable of detecting a touch gesture in the first or second region and scrolling the icons in the first region and the detailed information in the second region in response to the touch gesture. As a consequence, some old icons disappear and some new icons appear. The detailed information of one of the new icons is displayed in the second region.

According to the exemplary embodiment of the present invention, the offset of a scroll, i.e. a scroll range, may vary. The data display method and apparatus according to the exemplary embodiment of the present invention are capable of setting the scroll rate to touch movement distance. For example, if the scroll rate to touch movement distance is set to 1 and if the touch movement distance is 3 cm. in the first region, three new icons appear instead of three other icons disappearing in the first region. If the scroll rate to touch movement distance is set to 2 and the touch movement distance is 3 cm. in the first region, six new icons appear instead of six other icons disappearing in the first region. In spite of the same movement distance, if the scroll rate differs, the scroll range varies. The offset can be changed by various touch gestures, e.g. tap, double tap, long tap, drag, flick, press, pinch in, pinch out, etc.

According to the exemplary embodiment of the present invention, the display level of the icons can be changed. For example, when the icon indicates time, the display level can be changed from 'month' to 'year' or 'year' to 'month'. In the case that the display level is 'month', the second region displays the detailed information by month. In the case that the display level is 'year', the second region displays the detailed information by year. When the icon indicates location, the display level can be changed from 'village' to 'city' or 'city' to 'village'. In the case that the display level is 'city', the second region displays the detailed information by city. In the case that the display level is 'village', the second region displays the detailed information by village. The display level can be changed with various touch gestures such as tap, double tap, long tap, drag, flick, press, pinch in, and pinch out.

The data display method and apparatus according to the exemplary embodiment of the present invention is described in detail hereinafter. A detailed description of well-known functions and structures incorporated herein may be omitted to avoid obscuring the subject matter of the present invention. The terms and words used in this description and the appended claims are not to be interpreted in common or lexical meaning but, based on the principle that an inventor can adequately define the meanings of terms to best describe the present invention, to be interpreted in the meaning and context conforming to the technical aspects of the present invention. Therefore, the exemplary embodiment described in the specification and the constructions illustrated in the drawings correspond to the present invention, but do not represent all of the technical spirit of the present invention. Accordingly, it should be understood that various equivalents and modifications can substitute them at the time of filing the present invention. In the drawings, certain elements may be exaggerated or omitted or schematically depicted for clarity of the present invention. In the following, the description is directed to an electronic device to which the data display method and apparatus of the present invention are applied.

Exemplary embodiments of the present invention will be described with reference to the accompanying drawings. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of the present invention may be employed in varied and numerous exemplary embodiments without departing from the scope of the present invention.

The same reference numbers are used throughout the drawings to refer to the same or like parts.

Among the terms set forth herein, a terminal, a mobile device, a portable device, or an electronic device refers to any kind of device capable of processing data which is transmitted or received to or from any external entity. The terminal, the mobile device, the portable device, or the electronic device may display icons or menus on a screen to which stored data and various executable functions are assigned or mapped. The terminal, the mobile device, the portable device, or the electronic device may include a computer, a notebook, a tablet PC, a cellphone, and any known type of electronic device.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the electronic device such that a user can easily select a desired function or data. In particular, each icon has a mapping relation with any function being executable in the electronic device or with any data stored in the electronic device and is used for processing functions or selecting data in the electronic device. When a user selects one of the displayed icons, the electronic device identifies a particular function or data associated with the selected icon. Then the electronic device executes the identified function or displays the identified data.

Among the terms set forth herein, data refers to any kind of information processed by the electronic device, including text and/or images received from any external entities, messages transmitted or received, and information created when a specific function is executed by the electronic device.

Figure 1:
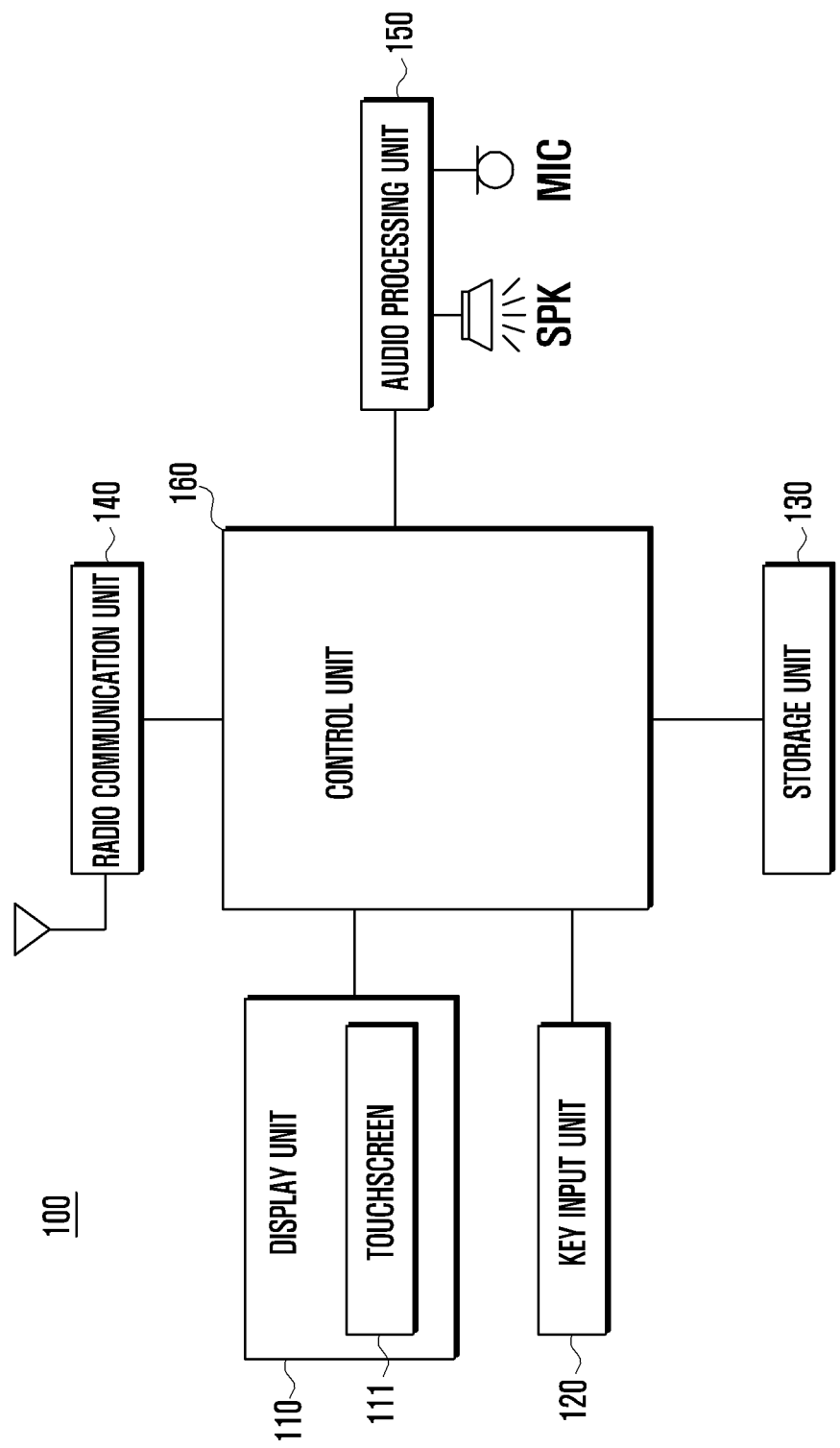
FIG. 1 is a block diagram illustrating the configuration of an electronic device according to an exemplary embodiment of the present invention.

FIG. 1 is a block diagram illustrating the configuration of the electronic device 100 according to an exemplary embodiment of the present invention.

As shown in FIG. 1, the electronic device 100 according to the exemplary embodiment of the present invention includes a display unit 110, a key input unit 120, a storage unit 130, a radio communication unit 140, an audio processing unit 150, a speaker (SPK), a microphone (MIC), and a control unit 160.

The display unit 110 converts the video data input from the control unit 160 to an analog signal to display on the screen of the display unit 110 under the control of the control unit 160. That is, the display unit 110 is capable of displaying various screens associated with the operations of the electronic device 100 such as a lock screen, a home screen, an application execution screen, and a virtual screen-based keypad. The lock screen can be defined as an image displayed on the display unit 110 when the electronic device 100 powers on. If a user's unlock gesture is detected, the control unit 160 changes the lock screen to the home screen or the application execution screen. The home screen can be defined as an image including icons representing the applications. If the user selects one of the application icons (e.g. taps an icon), the control unit 160 executes the corresponding application (e.g. an organizer application, a gallery application, a memo application, a messaging application, etc.) and displays the execution screen of the application. The application execution screen can be divided into a first region including the icons indicating times and a second region including detailed information of the icon selected in the first region (e.g. a schedule on March 8). The display unit 110 displays one of the aforementioned screens, e.g. an application execution screen in the background and another screen is displayed in the foreground as overlapping the background. The display unit 110 can be implemented with one of a Liquid Crystal Display (LCD), an Organic Light Emitted Diode (OLED), and an Active Matrix OLED (AMOLED).

The display unit 110 is provided with a touchscreen 111 as a user interface for interaction with the user. The touchscreen 111 can be implemented on the display unit 110 using any type of touchscreen known in the art. The touchscreen 111 generates an analog signal (e.g. touch event) in response to a user gesture and converts the analog signal to a digital signal, with the signal being transferred to the control unit 160. The control unit 160 detects the user gesture based on the touch event. The user's gesture can be classified into one of a touch and a touch gesture. The touch gestures include a tap, a double tap, a long tap, a drag, a drag and drop, a flick, a press, etc. Here, a 'touch' is a user's gesture of contacting a position on the screen with a touch device (e.g. finger and stylus pen), a 'tap' is a user's gesture of contacting a position on the screen with the touch device and releasing the contact (touch-off) without moving the touch device, a 'double tap' is a user's gesture of performing the tap twice, a 'long tap' is a user's gesture of maintaining the contact for a relatively long time as compared to the tap and then releasing the contact, a 'drag' is a user's gesture of contacting a position and moving the contact on the screen in a certain direction, a 'drag and drop' is a user's gesture of performing the drag gesture and then releasing the contact of the touch device, a 'flick' is a user's gesture of snapping or tapping on the screen quickly as compared to the drag gesture, and a 'press' is a user's gesture of contacting at a certain position on the screen and applying pressure. That is, the 'touch' refers to the state of maintaining contact on the screen, and the 'touch gesture' refers to the behavior of making the contact (touch-on) and then releasing the contact (touch-off). The touch panel 111 may include a pressure sensor for detecting the pressure of a press applied at the touched position. The detected pressure information is transferred to the control unit 160, and the control unit 160 discriminates between a touch and a press based on the pressure information.

The touch panel 111 can be implemented as a combined touch panel including a finger touch panel for detecting a gesture made by a part of the human body, such as a finger, and a pen touch panel for detecting a pen gesture made by a pen, stylus, or other pen-like objects. Here, the finger touch panel can be implemented as a capacitive type panel, and the finger touch panel is capable of detecting the touch gesture made by a certain object (e.g. a conductive material capable of changing electrostatic capacity) as well as a part of the human body. The pen touch panel can be implemented with an electromagnetic induction type panel. In this case, the pen touch panel generates a touch event in response to the gesture made by the touch pen or stylus, such as a pen manufactured to generate a magnetic field.

The key input unit 120 is provided with a plurality of keys for receiving alphanumeric information and configuring various functions. The function keys may include menu keys, a screen on/off key, a power on/off key, a volume control key, etc. The key input unit 120 is capable of generating a key event to the control unit 160 in association with a user setting and function control of the apparatus 100. The key events may include a power on/off event, a volume control event, a screen on/off event, etc. The control unit 160 controls the components of the apparatus 100 in response to these key events. The keys of the key input unit 120 are referred to as hard keys while the virtual keys, such as icons, provided on the touchscreen 110 are referred to as soft keys.

The storage unit 130 is a memory unit implemented with a memory such as NAND flash memory. The storage unit 130 can be divided into a program region and a data region. The storage unit 130 is capable of storing data generated in the electronic device 100 and/or received from external devices using the radio communication unit 140 under the control of the control unit 160. The storage unit 130 stores an Operating System (OS) of the electronic device 100 and various application programs. The storage unit 130 is also capable of storing embedded applications and third party application. The embedded applications are basic applications installed in the electronic device 100. The embedded applications may include a browser, an email application, an instant messenger application, etc. The third party applications are diverse applications that can be downloaded from an online market or other online sources, as well as external networks and installed in the electronic device 100. The third party applications can be installed and uninstalled freely. If the electronic device 100 is powered on, a booting program is loaded into a main memory device (e.g. RAM) of the control unit 160. The booting program loads the OS of the electronic device 100 into the main memory device. The OS loads the application programs into the main memory device and executes the application programs selectively. In particular, in the exemplary embodiment of the present invention, if a connection with an external device is detected, the OS loads a data communication program into the main memory device and executes the data communication program. Since the booting and load process is well-known in the computing field, a detailed description thereof is omitted herein.

The radio communication unit 140 is responsible for voice, video, and data communication under the control of the control unit 160. For this purpose, the radio communication unit 140 may include a Radio Frequency (RF) transmitter for up-converting and amplifying signals to be transmitted and an RF receiver for low noise amplifying and down-converting the received signal. The radio communication unit 140 may include at least one of a cellular communication module (a 3rd Generation (3G) cellular communication module, a 3.5G cellular communication module, a 4G cellular communication module, etc.), a digital broadcast module (e.g. a DMB module), and a short range communication module (e.g. a module for implementing WI-FI, a wireless technology for data exchange over a computer network, commercially available from the WI-FI ALLIANCE, and a module for implementing BLUETOOTH, a short range wireless communications technology at the 2.4 GHz band, commercially available from the BLUETOOTH SPECIAL INTEREST GROUP, INC.).

The audio processing unit 150 is connected to the speaker (SPK) and the microphone (MIC) and processes input and output audio data for supporting voice recognition, voice recording, digital recording, and telephony functions. The audio processing unit 150 receives audio data output from the control unit 160, converts the audio data to an analog signal, and outputs the analog signal through the speaker (SPK). The speaker (SPK) converts the analog signal from the audio processing unit 150 to output an audible sound wave. The microphone (MIC) converts a voice and other sound waves to an analog signal. The audio processing unit 150 receives the analog signal input through the microphone, converts the analog signal to audio data, and transfers the audio data to the control unit 160.

The control unit 160 controls the overall operations of the electronic device 100 and signal flows among the internal components of the electronic device 100 and processes data. The control unit 160 may include the main memory device for storing the OS and application programs, a cache memory for storing data to be written into the storage unit 130 temporarily or permanently and read from the storage unit 130, a Central Processing Unit (CPU), a Graphic Processing Unit (GPU), etc. Here, the OS is responsible for providing an interface between hardware and programs and manages computing resources such as the CPU, the GPU, the main memory device, and any auxiliary memory device. The OS operates the electronic device 100, schedules tasks, and controls operations of the CPU and GPU. The OS is also responsible for controlling program execution, and data and file storage management. As well-known in the prior art, the CPU may be the main control unit of a computer system which performs a data operation and comparison, and command interpretation and execution. The GPU is a graphic control unit for performing a graphic-related data operation and comparison, and command interpretation and execution. Each of the CPU and the GPU can be integrated into a package of a single integrated circuit including two or more independent cores (e.g. quad-core). The CPU and GPU may also be integrated into a chip in the form of a System on Chip (SoC). The CPU and the GPU may also be implemented in the form of a multi-layered package. The packaged CPU and GPU may be referred to as an Application Processor (AP).

The functions of the control unit 160 will be described in association with the components and the method of the present invention hereinafter with reference to the accompanying drawings.

In alternative exemplary embodiments, the electronic device 100 may also include at least one of an acceleration sensor, a gyro sensor, a camera, a Global Positioning System (GPS) module, a vibration motor, a Near Field Communication (NFC) module, an external device connection interface for data communication with an external device (e.g. other electronic devices, a desktop PC, a laptop PC, a headphone, etc.) through a wired connection, etc.

Figure 2:
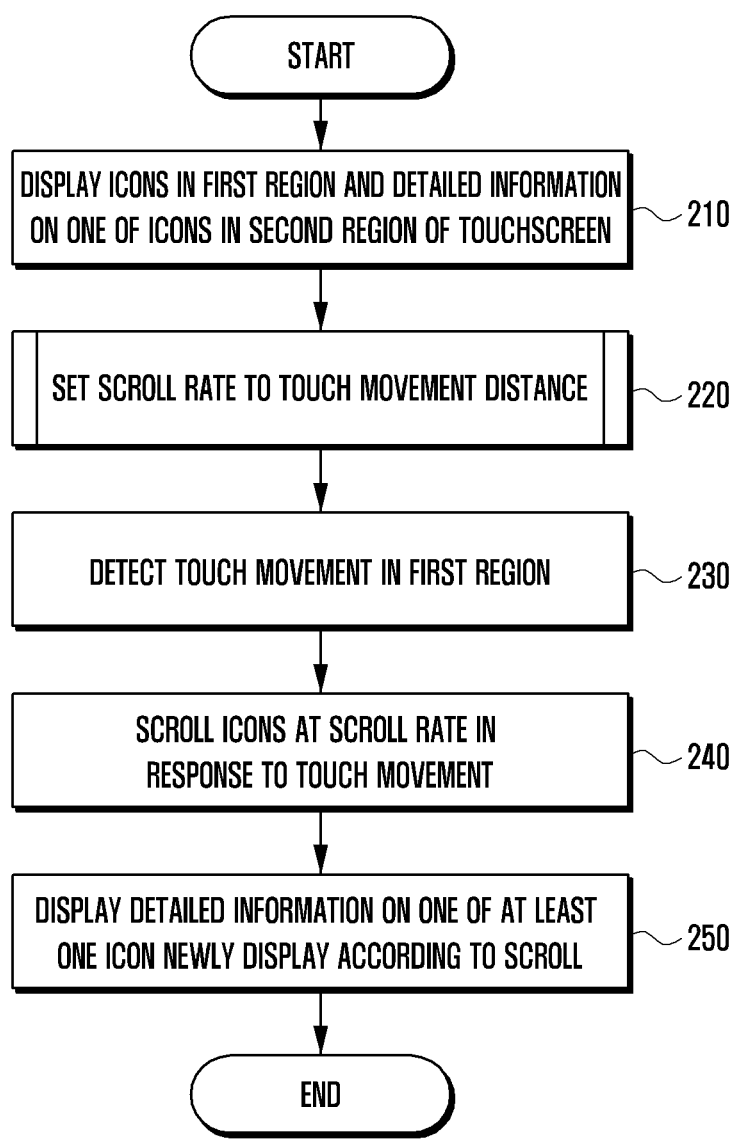
FIG. 2 is a flowchart illustrating the data display method according to the exemplary embodiment of the present invention.

The electronic device 100 according to the exemplary embodiment of the present invention can be implemented with or without any of the aforementioned components depending on the implementation of the present invention using the electronic device 100 and the components thereof. FIG. 2 is a flowchart illustrating the data display method according to the exemplary embodiment of the present invention.

Referring to FIG. 2, the control unit 160 controls the display unit 110 to display the icons in the first region of the touchscreen 111 at step 210. At this time, the control unit 160 controls the display unit 110 to display the detailed information of one of the icons in the second region. For example, the first region can be arranged at the bottom part of the screen and the second region at the top part, or vice versa. Also, the first region can be arranged at the left part of the screen and the second region at the right part, or vice versa. The first region can overlap the second region. That is, the icons can be presented in the detailed information. In this case, the icons may be presented in a semi-transparent manner. In the first region, the icons can be arranged horizontally or vertically.

The control unit 160 sets the ratio between the touch movement distance and the scroll amount at step 220. The control unit 160 detects a touch gesture in the first region and sets the ratio in response to the touch gesture. Step 220 is described in more detail with reference to FIG. 3. The control unit 160 detects the movement of the touch, e.g. drag or flick, in the first region at step 230.

The control unit controls the display unit 110 to scroll the icons at a preset ratio in response to the movement of the touch at step 240. For example, when the ratio is set to 1, if the touch movement distance is, for example, 3 cm, three icons are scrolled to appear into and to be displayed in the first region while three other icons are scrolled to disappear out of and to no longer be displayed in the first region. In another example, when the ratio is set to 2, if the touch movement distance is 3 cm, six icons are scrolled to appear into and to be displayed in the first region while six other icons are scrolled to disappear out of and to no longer be displayed in the first region. Meanwhile, the control unit 160 is capable of controlling the display unit 110 such that the scrolling is initiated only when the arrangement direction of the icons and the touch movement direction are identical with each other. For example, if the touch moves in the vertical direction in the state that the icons are arranged horizontally, no scroll action is initiated.

The control unit 160 selects at least one of the newly displayed icons (e.g. the last icon to be newly displayed) and controls the display unit 110 to display the detailed information of the selected icon in the second region at step 250. Here, the selected icon can be displayed to be differentiated from other unselected icons. For example, the selected icon can be displayed with a bold outline, or a different background color compared to the background colors of the other icons. The selected icon is also capable of being displayed with a mark (e.g. ☑ ) indicating that the selected icon is the icon of which detailed information is presented.

FIG. 3 is a flowchart illustrating the scroll rate setting method of the data display method according to the exemplary embodiment of the present invention, for implementing step 220 in FIG. 2.

Referring to FIG. 3, the control unit 160 detects a multi-touch gesture in the first region (e.g. a touch at two positions in the first region) at step 310. As described above, the first region is a region where the icons are arranged on the touchscreen 111.

The control unit 160 determines whether the multi-touch gesture is a pinch-in gesture at step 320.

If the multi-touch gesture is the pinch-in gesture, the control unit 160 sets the scroll rate to the touch movement distance to a relatively high value at step 330. That is, the control unit 160 increases the scroll rate as the two touch points become close. For example, if the distance between the two touch points decreases from 3 cm. to 1 cm. in the state that the scroll rate is set to 1, the control unit 160 increases the scroll rate to 2. At step 330, the control unit 160 also increases the number of icons to be displayed in the first region. For example, if the scroll rate increases from 1 to 2, the control unit 160 increases the number of icons to be displayed in the first region from 3 to 6. After step 330, the method of FIG. 3 ends.

However, in step 320, if the multi-touch is a pinch-out gesture, the control unit 160 sets the scroll rate to the touch movement distance to a relatively low value at step 340. That is, the control unit 160 decreases the scroll rate as the two touch points become distant. For example, if the distance between the two touch points increases from 1 cm. to 3 cm. in the state that the scroll rate is set to 2, the control unit 160 decreases the scroll rate to 1. At step 340, the control unit 160 also decreases the number of icons to be displayed in the first region. For example, if the scroll rate decreases from 2 to 1, the control unit 160 decreases the number of icons to be displayed in the first region from 6 to 3. After step 340, the method of FIG. 3 ends.

In contrast to the case of step 330, the electronic device 100 can be configured such that the scroll rate decreases with the reduction of the number of icons in the detection of a pinch-in gesture. Also, in contrast to the case of step 340, the electronic device 100 may be configured such that the scroll rate increases with the increase of the number of icons in the detection of a pinch-out gesture. The initial or default scroll rate may be set to 1, the initial or default scroll rate to the touch movement distance may be set to 1 cm, and the initial or default number of icons to be displayed in the first region or the initial or default number of new icons to be displayed in the first region during scrolling for a predetermined distance of, for example, 1 cm, may be set to 1.

Each of these initial or default parameters including the scroll rate, the scroll rate to the touch movement distance, the number of icons to be displayed in the first region, and the number of new icons to be displayed in the first region during scrolling of a predetermined distance, such as 1 cm, may be set at the time of manufacture of the electronic device 100 and stored in the control unit 160 and/or the storage unit 130, and such parameters may be customized by the user of the electronic device 100.

Although the description of FIG. 3 is directed to the case where the offset, i.e. the scroll ratio to the touch movement distance is set in association with the pinch-in and pinch-out gestures, the present invention is not limited thereto but the scroll rate can be set in association with other touch gestures. For example, the control unit 160 is capable of setting the scroll ratio in proportion to a time duration of a press gesture.

FIGS. 4 and 5 are diagrams illustrating exemplary screen images of the data display method according to the exemplary embodiment of the present invention. The display unit 110 displays the home screen under the control of the control unit 160. The home screen includes an icon corresponding to a schedule program. If this schedule icon is selected by the user, the control unit 160 executes the schedule program and controls the display unit 110 to display the execution screen as shown in screen (a) of FIG. 4.

Referring to screen (a) of FIG. 4, the display unit 110 displays the icons 411 to 413 in the first region 410 of the screen (a) under the control of the control unit 160. The icons 411 to 413 indicate the dates of December 2011, January 2012, and February 2012, respectively. When an icon 411-413 is selected, the second region 420 displays detailed information associated with the selected icon. The selected icon may be highlighted or otherwise may have its appearance changed to distinguish the selected icon from the non-selected icons. For example, in screen (a), the display unit 110 highlights the icon 413, for example, by graying the background color of the icon 413, and also displays the detailed information associated with the icon 413 in the second region 420, i.e. the schedules in February 2012. The control unit 160 detects a right flick gesture 430 in the second region 420, with the right flick gesture 430 represented by a gray rightward arrow corresponding to the direction of the flick gesture and overlapping the detailed information in the second region 420.

Referring to screen (b) of FIG. 4, the control unit 160 scrolls the icons of the first region 410 and the detailed information of the second region 420 in response to the right flick gesture 430 in screen (a). That is, the control unit 160 controls the display unit 110 to remove the icon 413 and add the new icon 414, corresponding to schedules for November 2011, and to alter the location of the icons 411, 412, 412 such that the screens (a) and (b) simulate the icon 413 disappearing out of the right side of the first region 410 and the icon 414 appearing from the left side of the first region 410. The control unit 160 also controls the display unit 110 such that the icon 412 is highlighted, for example, to have a gray background, and the detailed information associated with the icon 412, located at the right most side of the first region 410 (i.e. the schedules of January 2012), is displayed in the second region 420. In addition, referring to screen (b), the control unit 160 detects a pinch-in gesture 440 in the first region 410, represented by a pair of gray arrows having arrowheads facing each other and overlapping the icons 411, 412, 412 in the first region 410.

Referring to screen (c) of FIG. 4, the control unit 160 increases the number of icons to be displayed in the first region 410 in response to the pinch-in gesture 440 on the screen (b). That is, the control unit 160 adds the icons 415 to 417 to the icons 411, 412, 414 in the first region 410. The total number of icons increases from 3 to 6 in response to the pinch-in gesture 440. However, the icon 412 remains highlighted in the first region, and the corresponding detailed information continues to be displayed in the second region 420. Next, in screen (c) the control unit 160 detects the left flick gesture 450 in the second region 420, represented by a gray leftward arrow overlapping the detailed information in the second region 420.

Referring to screen (d) of FIG. 4, the control unit 160 scrolls the icons 411-412 and 414-417 of the first region 410 and changes the detailed information of the second region 420 in response to the left flick gesture 450 in screen (c). That is, the control unit 160 controls the display unit 110 such that the icon 415 disappears out of the left side to be removed from being displayed in the first region 410, and the icon 418 appears from the right side of the screen to be displayed in the first region 410. The control unit 160 also controls the display unit 110 such that the detailed information, associated with the icon 418 located at the right most side (for schedules in February 2012) of the first region 410, is displayed in the second region 420.

Referring to screen (a) of FIG. 5, the display unit 110 displays the icons 511 to 516 in the first region 510 under the control of the control unit 160. The icons 511-516 represent August to December 2011 and January 2012, respectively. The display unit 110 also displays the detailed information associated with the highlighted icon 516, i.e. schedules in January 2012) in the second region 520. The control unit 150 detects a left flick 530 in the first region 510, represented by a leftward gray arrow overlapping the icons 515-516 in the first region 510. Here, the movement distance of the left flick 530 corresponds to the width of one icon.

Referring to screen (b) of FIG. 5, the control unit 160 scrolls the icons 511-516 of the first region 510 in response to the left flick 530 in the screen (a). That is, the control unit 160 controls the display unit 110 such that the icon 511 disappears out of the left side and the icon 517 appears from the right side of the first region 510. The control unit 160 also controls the display unit 110 such that the icon 517 is highlighted and the detailed information associated with the icon 517, i.e. the schedules in February 2012, are displayed in the second region 520. Next, the control unit 160 detects a left flick 540 in the first region 510, represented by a leftward gray arrow overlapping the icons 512-517. The movement distance of the left flick 540 corresponds to the width of five icons.

Referring to screen (c) of FIG. 5, the control unit 160 scrolls the icons 512-517 of the first region 510 in response to the left flick 540 in screen (b). That is, the control unit 160 controls the display unit 110 such that the five icons 512 to 516, corresponding to the five-icon width of the left flick 540, disappear out of the left side of the first region, and the old icon 517 as well as the new icons 518, 519, 551, 552, and 553 appear sequentially from the left side of the first region 510, with the right most icon 553 being highlighted. The control unit 160 also controls the display unit 110 such that the detailed information associated with the icon 553, located at the right most side of the first region 510, which corresponds to schedules in July 2012, is displayed in the second region 520. Thus, the schedule application, icons, and schedules for each time period of each icon, may be selected, controlled, scrolled through, and displayed depending on the flicks and other touch gestures on the first regions 410, 510 and on the second regions 420, 520 in FIGS. 4-5, respectively.

FIGS. 6A and 6B are diagrams illustrating exemplary screen images of the data display method associated with a gallery application according to an alternative exemplary embodiment of the present invention. FIGS. 7A and 7B are exemplary screen images of the data display method associated with a memo application according to the alternative exemplary embodiment of the present invention. Since FIGS. 7A and 7B are identical to FIGS. 6A and 6B, respectively, with the exception that the memo application to which the present invention is applied differs from the gallery application of FIGS. 6A and 6B, detailed descriptions of the data display method with reference to FIGS. 7A and 7B are omitted herein.

Referring to screen (a) of FIG. 6A, the display unit 110 displays the icons 611 to 613 in the first region 610 and the detailed information associated with the highlighted icon 613 in the second region 620. That is, the display unit 110 displays the thumbnail images of the still and motion pictures taken in February 2012 in the second region 620. Next, the control unit 160 detects a right flick 630 in the second region 620, represented by the rightward gray arrow overlapping the images in the second region 620.

Referring to screen (b) of FIG. 6A, the control unit 160 scrolls the icons 611, 612, 613, 614 of the first region 610 and the detailed information of the second region 620 in response to the right flick 630 in screen (a). That is, the icon 613 disappears out of the right side of the first region 610 and the icon 614 appears from the left side of the first region 610. As a consequence, the detailed information associated with the icon 613 is replaced with the detailed information associated with the highlighted icon 612 in the second region 620. In addition, in the screen (b), the control unit 160 detects a pinch-out 640 in the first region 610, represented by the pair of gray arrows facing away from each other and overlapping the icons 611, 612, 614 in the first region 610.

Referring to screen (c) of FIG. 6A, the control unit 160 increases the number of icons to be displayed in the first region 610 from 3 to 6 in response to the pinch-out 640 in the screen (b). Next, the control unit 160 detects a right flick 650 in the second region 620, represented by a rightward gray arrow overlapping the images in the second region 620 to display the screen (d) with icons for the months July 2011 to December 2011, with the rightmost icon for December 2011 being highlighted, and the images in the second region 620 corresponding to the highlighted icon for December 2011.

Referring to screen (d) of FIG. 6B, the control unit 160 scrolls the icons of the first region 610 in screen (c) leftward, in response to the right flick 650, to show icons for the months July 2011 to December 2011 in screen (d), and the detailed information of the second region 620 is changed to the images for the rightmost highlighted icon for December 2011 in response to the right flick 650. That is, the right most icon for January 2012 in screen (c) moves leftward and disappears out of the leftmost side of the first region 610 and a new icon for December 2011 appears from the right side of the first region 610 and moves to be displayed in the rightmost position in the first region 610 in screen (d). As a consequence, the detailed information associated with the new right most icon of the first region 610, corresponding to December 2011, is displayed in the second region 620 in screen (d). Next, referring to screen (d), the control unit 160 detects a left flick 660 in the first region 610, represented by the leftward gray arrow overlapping the icons in the first region 610 of screen (d). The movement distance of the left flick 660 corresponds to the width of five icons.

Referring to screen (e) of FIG. 6B, the control unit 160 scrolls the icons of the first regions 610 in response to the left flick 660. As a consequence, five icons, corresponding to July 2011 to November 2011, disappear out of the left side of the first region 610 in screen (d), and five new icons, corresponding to January 2012 to May 2012, appear from the right side of the first region 610 in screen (e). The detailed information associated with the right most highlighted icon, i.e. still and motion pictures taken in May 2012, is displayed in the second region 620 in screen (e). Next, the control unit 160 detects a pinch-in 670 in the first region 610 in screen (e), represented by a pair of facing gray arrows overlapping the icons in the first region 610 in screen (e).

Referring to screen (f) of FIG. 6B, the control unit 160 decreases the number of icons to be displayed in the first region 610 in response to the pinch-in 670 on screen (e). That is, the number of icons decreases from 6 to 3 as shown in screen (e) to show only icons from March 2012 to May 2012.

FIGS. 8A and 8B are diagrams illustrating exemplary screen images of the data display method in association with a messaging application according to the exemplary embodiment of the present invention.

Referring to screen (a) of FIG. 8A, the display unit 110 displays the icons 811 to 813 indicating dates of messages in the first region 810 under the control of the control unit 160. The display unit 110 displays the detailed information associated with the icon 811, i.e. messages exchanged with another electronic device today, in the second region 820 arranged left side of the first region 810, with the icon 811 being highlighted. In this state, the control unit 160 detects a downward flick 830 in the second region 820, represented by the downward gray arrow overlapping the messages in the second region 820.

Referring to screen (b) of FIG. 8A, the control unit 160 scrolls the icons 811-813 of the first region 810 and the detailed information of the second region 820 in response to the downward flick 830 in screen (a). As a consequence, the icon 811 disappears out of the bottom side of the first region 810, and the icon 814 appears from the top side of the first region 810, with the bottom most icon 812 for messages from yesterday being highlighted, and detailed information such as messages from yesterday are displayed in the second region 820. Alternatively, if there is additional detailed information associated with the icon 811, only the detailed information is scrolled in the second region 820 (i.e. an additional message exchanged with the other electronic device appears) without scrolling of the icons 811-812 in the first region 810. Next, the control unit 160 detects a pinch-in 840 in the first region 810 in the screen (b), represented by the facing gray arrows overlapping the icons 812-814 in the first region 810.

Referring to screen (c) of FIG. 8A, the control unit 160 increases the number of icons to be displayed in the first region 810 from 3 to 6 in response to the pinch-in 840 in screen (b). As a consequence, the icons 815 to 817 are added to the first region 810, but the icons 812 remains highlighted and the detailed information for the icon 812 remains in the second region 820. Next, the control unit 160 detects an upward flick 850 in the first region 810, represented by the upward gray arrow overlapping the first region 810 in the screen (c). As shown in screen (c), the movement distance of the upward flick 850 corresponds to the vertical length of one icon.

Referring to screen (d) of FIG. 8B, the control unit 160 scrolls the icons of the first region 810 upward, so that the icon 811 for today appears at the bottom most position in the first region 810, with the icon 811 highlighted, and the detailed information of the second region 820 is changed to the detailed information, that is, the messages of today, in response to the upward flick 850. As a consequence, the icon 817 disappears out of the top side of the first region 810 and the icon 811 appears from the bottom of the first region 810. Next, the control unit 160 detects a downward flick 860 in the first region 810. As shown in the screen (d), the downward flick 860 corresponds to the vertical length of five icons, with the downward flick 860 represented by the downward gray arrow overlapping the first region 810 in the screen (d).

Referring to screen (e) of FIG. 8B, the control unit 160 scrolls the icons 811-816 in screen (d) downward as far as five icons in response to the download flick 860 in screen (d). As a consequence, the icons 811 to 815 disappear out of the bottom side of the first region 810 and the icons 817, 819, 871, and 872 appear from the top side of the first region 810. At this time, the second region 820 displays the detailed information associated with the icon 816 highlighted and positioned at the bottom most side of the first region 810. Next, the control unit 160 detects a pinch-out 880 in the first region 810, represented by the pair of opposite facing gray arrows overlapping the first region 810.

Referring to screen (f) of FIG. 8B, the control unit 160 decreases the number of icons to be displayed in the first region 810 from 6 to 3 in response to the pinch-in 880 on the screen (e), so that only the icons for March 26-28 are displayed in the first region 810, with the icon for March 28 being highlighted and the detailed information for March 28 being displayed in the second region 810.

FIG. 9 is a flowchart illustrating the data display method according to the alternative exemplary embodiment of the present invention.

Referring to FIG. 9, the control unit 160 controls the display unit 110 to display icons in the first region of the touchscreen 111 at step 910. At step 910, the control unit 160 also controls the display unit 110 to display the detailed information associated with one of the icons in the second region of the touchscreen 111. Here, the first and second regions can be arranged separately. The first region is also capable of overlapping the second region. In this case, the icons are displayed in a semi-transparent manner.

The control unit 160 changes the display level of the icons in the first region at step 920. Step 920 is described in more detail with reference to FIG. 10.

The control unit 160 controls the display unit 110 to display the detailed information of one of the icons changed in display level in the second region at step 930.

FIG. 10 is a flowchart illustrating the icon display level change method of the data display method according to the exemplary embodiment of the present invention, implementing step 920 in FIG. 9.

Referring to FIG. 10, the control unit 160 detects a multi-touch in the first region (e.g. a simultaneous touch at two positions of the first region) at step 1010. As aforementioned, the first region is the region for displaying icons on the touchscreen 111.

The control unit 160 determines whether the multi-touch is a pinch-in at step 1020.

If it is determined that the multi-touch is a touch-out or a pinch-out in step 1020, the control unit 160 increases the display level of the icons at step 1030, and the method of FIG. 10 then ends, and the controller 160 proceeds to step 930 in FIG. 9. The display levels refer to a hierarchy of detail stored in the storage unit 130, by which items such as messages and images are organized by units of time, of location, of distance, etc. For example, in the case that the icons are associated with images such as photos or messages and when such images and messages were taken, transmitted, or received, the display level changes from 'month' to 'year'. In the case of the icons are associated with locations such as places to go to in a schedule, the display level changes from 'village' to 'city'.

However, if it is determined in step 1020 that the multi-touch is a touch-in or a pinch-in, the control unit 160 decreases the display level of the icons at step 1040, and the method of FIG. 10 then ends, and the controller 160 proceeds to step 930 in FIG. 9. For example, in the case that the icons are associated with times, the display level changes from 'year' to 'month'. In the case that the icons are associated with locations, the display level changes from 'city' to 'village'. Alternatively, in step 1030, the display level can be decreased for a pinch-out. Also, alternatively in step 1040, the display level can be increased for a pinch-in.

Although the description herein for the present invention has been directed to the case of setting the display level in association with the pinch-in and pinch-out gestures, the present invention is not limited thereto, but instead the display level can be set in association with other touch gestures. For example, the control unit 160 is capable of setting the display level in proportion to the length of maintaining a press gesture.

FIGS. 11A and 11B are diagrams illustrating exemplary screen images of the data display method in association with a gallery application according to the exemplary embodiment of the present invention.

Referring to screen (a) of FIG. 11A, the display unit 110 displays the high level icons 1111 to 1116 in the first region 1110 of the screen (a) under the control of the control unit 160. The high level icons 1111 to 1116 indicates years 2007 to 2012, respectively. The display unit 110 also displays the detailed information associated with the high level icon 1116, i.e. the thumbnails images of still and motion pictures taken in year 2012. In this state, the control unit 160 detects a right flick 1130 in the second region 1120, represented by a rightward gray arrow overlapping the images in the second region 1120.

Referring to screen (b) of FIG. 11A, the control unit 160 scrolls the high level icons of the first region 1110 and the detailed information of the second region 1120 in response to the right flick 1130 in screen (a). As a consequence, the icons 1111 to 1116 move to the left in the first region 1110 by one column or by one icon. Accordingly, the high level icon 1116 disappears out of the right side of the first display region 1110, and the high level icon 1117 appears from the left side of the first display region 1110. In the second region 1120, the detailed information associated with the high level icon 1116 is replaced with the detailed information associated with the high level icon 1115 which is newly located at the right most side of the first region 1110. Next, the control unit 160 detects a pinch-out 1140 in the first region 1110, represented by opposite facing gray arrows overlapping the icons 1111-1115 and 1117 in the first region 1110.

Referring to screen (c) of FIG. 11A, the control unit 160 decreases the display level of the high level icons 1111 to 1115 and 1117 by one step or level so as to display the low level icons 1151 to 1156, corresponding to a lower level associated with the current or selected icon, being the rightmost icon 1115 for which the detailed information is displayed in the second region 1120, in response to the pinch-out on the screen (b). The display unit 110 also displays the detailed information associated with the low level icon 1156 located at the right most side of the first region 1110, i.e. thumbnail images of still and motion pictures taken in December 2011, in the second region 1120 under the control of the control unit 160. In this state, the control unit 160 detects a left flick 1160 in the second region 1120, represented by a leftward gray arrow overlapping the images in the second region 1120.

Referring to screen (d) of FIG. 11B, the control unit 160 moves the low level icons 1151 to 1156 to the left by one column or one icon in response to the left flick 1160 in screen (c). As a consequence, the low level icon 1151 disappears out of the left side of the first region 1110, and the low level icon 1157 appears from the right side of the first region 1110. The control unit 160 also controls the display unit 110 such that the detailed information associated with the low level icon is displayed in the second region 1120. Next, the control unit 160 detects a left flick 1170 in the first region 1110, represented by the leftward gray arrow overlapping the icons 1152-1157 in the first region 1110. The movement distance of the left flick 1170 corresponds to the width of five columns (i.e. five icons).

Referring to screen (e) of FIG. 11B, the control unit 160 moves the low level icons to the left in the first region 1110 by five columns or icons in response to the left flick 1170 on the screen (d). As a consequence, the low level icons 1152 to 1156 disappear out of the left side of the first region 1110 and the low level icons 1158 to 1159 and 1181 to 1183 appear from the right side of the first region 1110. The control unit 160 also controls the display unit 110 such that the detailed information associated with the low level icon 1183 located at the right most side of the first region 1110 is displayed in the second region 1120. Next, the control unit 160 detects a pinch-in 1190 in the first region 1110, represented by the facing gray arrows overlapping the icons 1157-1159 and 1181-1183 in the first region 1110.

Referring to screen (f) of FIG. 11B, the control unit 160 increases the display level of the low level icons 1157, 1158, 1159, 1181, 1182, and 1183 by one step or one level, so as to display the icons 1111 to 1116 in the first region 1110 in response to the pinch-in 1190 on the screen (e). The control unit 160 also controls the display unit 110 such that the detailed information, associated with the high level icon 1116 located at the right most side of the first region 1110 among the high level icons in the second region 1120, is displayed.

FIGS. 12A and 12B are diagrams illustrating exemplary screen images of the data display method in association with a gallery application according to the alternative exemplary embodiment of the present invention. FIGS. 12A and 12B are almost identical to FIGS. 11A and 11B with the exception that the control unit 160 detects a pinch-in 1230 in the second region 1220 as shown in the screen (e) of FIG. 12B, and represented by the facing gray arrows overlapping the images in the second region 1220. Referring to the screen (f) of FIG. 12B, the control unit 160 changes the low level icons in the first region 1210 in the screen (e) to the high level icons in the first region 1210 in the screen (f) in response to the pinch-in 1230 on the screen (e). The control unit 160 also controls the display unit 110 such that the detailed information, associated with the high level icon located at the right most of the first region 1210 among the high level icons and corresponding to images from the year 2012, are displayed in the second region 1220 in the screen (f).

FIGS. 13A, 13B, 14A, and 14B are diagrams illustrating exemplary screen images of the data display method in association with a memo application according to the exemplary embodiment of the present invention. Since FIGS. 13A, 13B, 14A, and 14B are identical to FIGS. 11A, 11B, 12A, and 12B, respectively, in scenarios with the exception of the target and items to which the present invention is applied, such as memos in FIGS. 13A-14B instead of images in gallery applications in FIG. 11A-12B, detailed descriptions thereof are omitted herein.

FIGS. 15A and 15B are diagrams illustrating exemplary screen images of the data display method in association with a messaging application according to the exemplary embodiment of the present invention.

Referring to screen (a) of FIG. 15A, the display unit 110 displays the low level icons 1511 to 1513 indicating dates in the first region 1510 under the control of the control unit 160. The display unit 110 also displays the detailed information associated with the low level icon 1511, i.e. messages exchanged with another electronic device on November 7, in the second region 1520 arranged on the left side of the first region 1510. In this state, the control unit 160 detects a download flick 1530 in the second region 1520, represented by the downward gray arrow overlapping the messages in the second region 1520.

Referring to screen (b) of FIG. 15A, the control unit 160 scrolls the low level icons 1511-1513 of the first region 1510 and the detailed information of the second region 1520 in response to the downward flick 1530. As a consequence, the low level icon 1511 disappears out of the bottom side of the first region 1510 and the low level icon 1514 appears from the top side of the first region 1510. Accordingly, the detailed information of the low level icon 1512 located at the bottom most side of the first region 1510 is displayed in the second region 1520. In this state, the control unit 160 detects a pinch-in 1540 in the first region 1510, represented by facing gray arrows overlapping the icons 1512-1514 in the first region 1510.

Referring to screen (c) of FIG. 15A, the control unit 160 changes the display level of the low level icons 1512 to 1514 by one step or one level so as to display the high level icons 1551 to 1556 in response to the pinch-in 1540 in the screen (b). The control unit 160 also controls the display unit 110 such that detailed information associated with the high level icon 1551 located at the bottom of the first region is displayed in the second region 1520. In this state, the control unit 160 detects an upward flick 1560 in the second region 1520, represented by an upward arrow overlapping the messages in the second region 1520.

Referring to screen (d) of FIG. 15B, the control unit 160 scrolls the detailed information of the second region 1520 in response to the upward flick 1560 in the screen (c). As a consequence, the detailed information associated with the high level icon 1551 is replaced with the detailed information associated with the high level icon 1557. At this time, the high level icons 1551 to 1556 in the first region move by one row (i.e. by one icon). As a consequence, the icon 1556 disappears out of the top side of the first region 1510, and the high level icon 1557 appears at the bottom side of the first region 1510. In this state, the control unit 160 detects a downward flick 1570 in the first region 1510, represented by the downward gray arrow overlapping the icons 1551-1555 and 1557 in the first region 1510.

Referring to screen (e) of FIG. 15B, the control unit 160 scrolls the high level icons 1551-1555 and 1157 downward in response to the downward flick 1570 on the screen (d). As a consequence, the high level icon 1557 and the high level icons 1551 to 1554 disappear out of the bottom side of the first region 1510 and the high level icons 1558, 1559, 1581 and 1581 to 1583 appear from the top side of the first region 1510. Also, the detailed information associated with the high level icon 1555 located at the bottom side of the first region 1510 is displayed in the second region 1520. In this state, the control unit 160 detects a pinch-out 1590 in the first region 1510, represented by the opposite facing gray arrows overlapping the icons 1555, 1558-1559, and 1581-1583 in the first region 1510.

Referring to screen (f) of FIG. 15B, the control unit 160 changes the high level icons to the low level icons 1591 to 1593 in response to the pinch-out 1590 on the screen (f). Here, the high level icon corresponding to the low level icons 1591 to 1593 can be the high level icon 1555 selected before the detection of the pinch-out 1590 in the screen (e).

As described above, the data display method and apparatus of the present invention is capable of scrolling the data displayed on the touchscreen efficiently according to the user's intention. Also, the data display method and apparatus of the present invention is capable of adjusting the scroll offset, i.e. the scroll rate to the touch movement distance, so as to control the scroll speed as the user intended. Also, the data display method and apparatus of the present invention divides the screen into the first and second regions and reflects the scroll gesture detected in one region to the scroll action in the other region.

The above-described data display methods according to the exemplary embodiments of the present invention can be implemented in the form of computer-executable program commands and stored in a non-transitory computer-readable storage medium. The non-transitory computer readable storage medium may store the program commands, data files, and data structures in individual or combined forms. The program commands recorded in the non-transitory storage medium may be designed and implemented for various exemplary embodiments of the present invention or used by those skilled in the computer software field. The non-transitory computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with at least one software module for executing the operations of the various exemplary embodiments of the present invention.

The above-described apparatus and methods of the disclosure can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

The data display method and apparatus of the present invention is not limited to the above-described exemplary embodiments but can be practiced with the various modifications without departing from the spirit and scope of the present invention.

What is claimed is:

1. A data display method of an electronic device having a touchscreen, the method comprising:
    detecting a first touch gesture in a first region of the touchscreen;
    setting a scroll rate based on a touch movement distance of the first touch gesture in the first region;
    detecting a second touch gesture in a second region of the touchscreen;
    scrolling icons in the first region at the scroll rate in response to the second touch gesture to display at least one newly displayed icon with the disappearance of at least one previously displayed icon in the first region; and
    displaying detailed information associated with one of the at least one newly displayed icon in the second region of the touchscreen,
    wherein the setting comprises adjusting a number of icons to be displayed in the first region based on the scroll rate.

2. The method of claim 1, wherein the first touch gesture is a multi-touch gesture.

3. The method of claim 2, wherein the setting comprises setting the scroll rate to a first value when the multi-touch gesture is a pinch-in gesture and a second value less than the first value when the multi-touch gesture is a pinch-out gesture.

4. The method of claim 3, wherein the adjusting comprises increasing the number of icons to be displayed in the first region for the pinch-in gesture and decreasing the number of icons to be displayed in the first region for the pinch-out gesture.

5. The method of claim 2, wherein the setting comprises setting the scroll rate to a first value when the multi-touch gesture is a pinch-out gesture and a second value less than the first value when the multi-touch gesture is a pinch-in gesture.

6. A data display method of an electronic device having a touchscreen, the method comprising:
    displaying icons in a first region of the touchscreen and detailed information in a second region of the touchscreen, with the detailed information being associated with one of the displayed icons;
    changing a current display level of all of the icons in the first region, with the display level associated with a hierarchy, in response to a pinch gesture, in the second region; and
    displaying detailed information of one of the icons with the changed display level in the second region.

7. The method of claim 6, wherein the changing comprises:
    detecting a multi-touch gesture in one of the first and second regions.

8. The method of claim 7, wherein the changing comprises increasing the current display level to a higher level in the hierarchy when the multi-touch gesture is a pinch-in gesture and decreasing the current display level to a lower level in the hierarchy when the multi-touch gesture is a pinch-out gesture.

9. The method of claim 8, wherein the display levels in the hierarchy are associated with one of time and location.

10. An electronic device comprising:
    a display unit which has a touchscreen including a first region for displaying icons and a second region for displaying detailed information; and
    a control unit which controls detecting a first touch gesture in the first region of the touchscreen, setting a scroll rate based on a touch movement distance of the first touch gesture in the first region, detecting a second touch gesture in the second region of the touchscreen, scrolling icons in the first region at the scroll rate in response to the touch gesture to display at least one newly displayed icon with the disappearance of at least one previously displayed icon in the first region, and displaying detailed information associated with one of the at least one newly displayed icon in the second region of the touchscreen, in response to a scroll,
    wherein the control unit controls adjusting a number of icons to be displayed in the first region based on the scroll rate.

11. The electronic device of claim 10, wherein the first touch gesture is a multi-touch gesture.

12. The electronic device of claim 11, wherein the control unit sets the scroll rate to a first value when the multi-touch gesture is a pinch-in gesture and a second value less than the first value when the multi-touch gesture is a pinch-out gesture.

13. An electronic device comprising:
a display unit with a touchscreen having a first region for displaying icons and a second region for displaying detailed information associated with one of the displayed icons; and
a control unit which controls the display unit to change a current display level of all of the icons in the first region with the display level associated with a hierarchy, in response to a pinch gesture, in the second region and to display the detailed information of one of the icons with changed display level in the second region.

14. The electronic device of claim 13, wherein the control unit detects a multi-touch gesture in one of the first and second regions.

15. The electronic device of claim 14, wherein the control unit increases the current display level to a higher level in the hierarchy when the multi-touch gesture is a pinch-in gesture and decreases the current display level to a lower level in the hierarchy when the multi-touch gesture is a pinch-out gesture.

* * * * *